United States Patent
Bouchard et al.

(10) Patent No.: US 11,201,728 B1
(45) Date of Patent: Dec. 14, 2021

(54) DATA LEAKAGE MITIGATION WITH A BLOCKCHAIN

(71) Applicant: McAfee, LLC, Santa Clara, CA (US)

(72) Inventors: Antoine Bouchard, Calgary (CA); Eric Wuehler, Hillsboro, OR (US); Jonathan B. King, Forest Grove, OR (US)

(73) Assignee: McAfee LLC, San Jose, CA (US)

( * ) Notice: Subject to any disclaimer, the term of this patent is extended or adjusted under 35 U.S.C. 154(b) by 252 days.

(21) Appl. No.: 16/588,659

(22) Filed: Sep. 30, 2019

(51) Int. Cl.
H04L 29/06 (2006.01)
H04L 9/06 (2006.01)
H04L 12/24 (2006.01)
H04L 9/32 (2006.01)

(52) U.S. Cl.
CPC .......... *H04L 9/0637* (2013.01); *H04L 9/3247* (2013.01); *H04L 9/3297* (2013.01); *H04L 41/0631* (2013.01)

(58) Field of Classification Search
CPC ... H04L 9/0637; H04L 9/3297; H04L 9/3247; H04L 41/0631
See application file for complete search history.

(56) References Cited

U.S. PATENT DOCUMENTS

| | | | | |
|---|---|---|---|---|
| 8,205,242 | B2* | 6/2012 | Liu | H04L 63/20 726/1 |
| 8,561,206 | B1* | 10/2013 | Paul | G06F 21/62 726/27 |
| 2018/0083786 | A1* | 3/2018 | Dierks | G06Q 20/3678 |
| 2018/0089041 | A1* | 3/2018 | Smith | G06F 16/2255 |
| 2018/0255090 | A1* | 9/2018 | Kozloski | H04L 67/02 |
| 2018/0294966 | A1* | 10/2018 | Hyun | H04L 9/3226 |
| 2019/0122296 | A1* | 4/2019 | Ying | H04L 9/0637 |
| 2019/0171744 | A1* | 6/2019 | Bache | H04L 9/14 |
| 2019/0171849 | A1* | 6/2019 | Assenmacher | G06F 21/64 |
| 2019/0391972 | A1* | 12/2019 | Bates | G06F 16/27 |

(Continued)

OTHER PUBLICATIONS

Bhowmik, "The Multimedia Blockchain: A Distributed and Tamper-proof Media Transaction Framework," IEEE International Conference on Digital Signal Processing, 2017, 7 pages, (pre-publication version).

(Continued)

*Primary Examiner* — Sher A Khan
(74) *Attorney, Agent, or Firm* — Hanley, Flight & Zimmerman, LLC

(57) ABSTRACT

Example data leakage detection apparatus disclosed herein include a fingerprinter to generate a first data fingerprint of a first data item accessed from a data source. Disclosed example data leakage detection apparatus also include a blockchain scanner to scan a blockchain to detect whether a first blockchain record includes a second data fingerprint that matches the first data fingerprint of the first data item. Disclosed example data leakage detection apparatus further include a blockchain writer to write a second blockchain record to the blockchain when the second data fingerprint matches the first data fingerprint, the second blockchain record to indicate the first data item is associated with a data leak of a protected data item represented by the second data fingerprint. In some examples, the second blockchain record is to include the first data fingerprint and a first timestamp.

17 Claims, 14 Drawing Sheets

(56) References Cited

U.S. PATENT DOCUMENTS

2020/0211305 A1\* 7/2020 Bender .................... G07C 9/37
2020/0285725 A1\* 9/2020 Dong .................. G06F 3/04883

OTHER PUBLICATIONS

"How Content ID Works," YouTube, 2019, 3 pages. Retrieved from https://support.google.com/youtube/answer/2797370?hl=en.
Liang et al., "ProvChain: A Blockchain-based Data Provenance Architecture in Cloud Environment with Enhanced Privacy and Availability," IEEE/ACM International Symposium on Cluster, Cloud and Grid Computing, 2017, 10 pages.

\* cited by examiner

DATA LEAKAGE MITIGATION WITH A BLOCKCHAIN

FIELD OF THE DISCLOSURE

This disclosure relates generally to data leakage detection and, more particularly, to data leakage mitigation with a blockchain.

BACKGROUND

Data leakage prevention, also referred to as data loss prevention, includes technology to detect potential data breaches and/or other unauthorized access of protected data items, such as private, sensitive and/or confidential data items, in a trusted domain, such as a data owner's network, database, cloud service, etc. Such data leakage prevention technology is often focused on detecting unauthorized data access while the protected data items remain in the trusted domain. If an unauthorized data access is successful and a protected data item leaves the trusted domain, the options for the data owner to detect and mitigate the data leakage may be limited. For example, to enlist the aid of a third-party data leakage detection solution to detect and mitigate unauthorized access of a protected data item, the data owner may be asked to share the protected data item with the third-party to enable the third-party data leakage detection solution to search for the protected data item on data sites outside the trusted domain (e.g., on the dark web). However, such sharing of the protected data item may be undesirable due to its private, sensitive and/or confidential nature, which may limit the choice of third-parties to trusted third parties, or cause the data owner to forego enlisting a third-party solution altogether. Given such limited options, a data owner may not become aware of an unauthorized data access until after the associated protected data item, or a portion thereof, has been released (e.g., leaked) and available on a public site (e.g., on the dark web) for some period of time.

Figure 1:
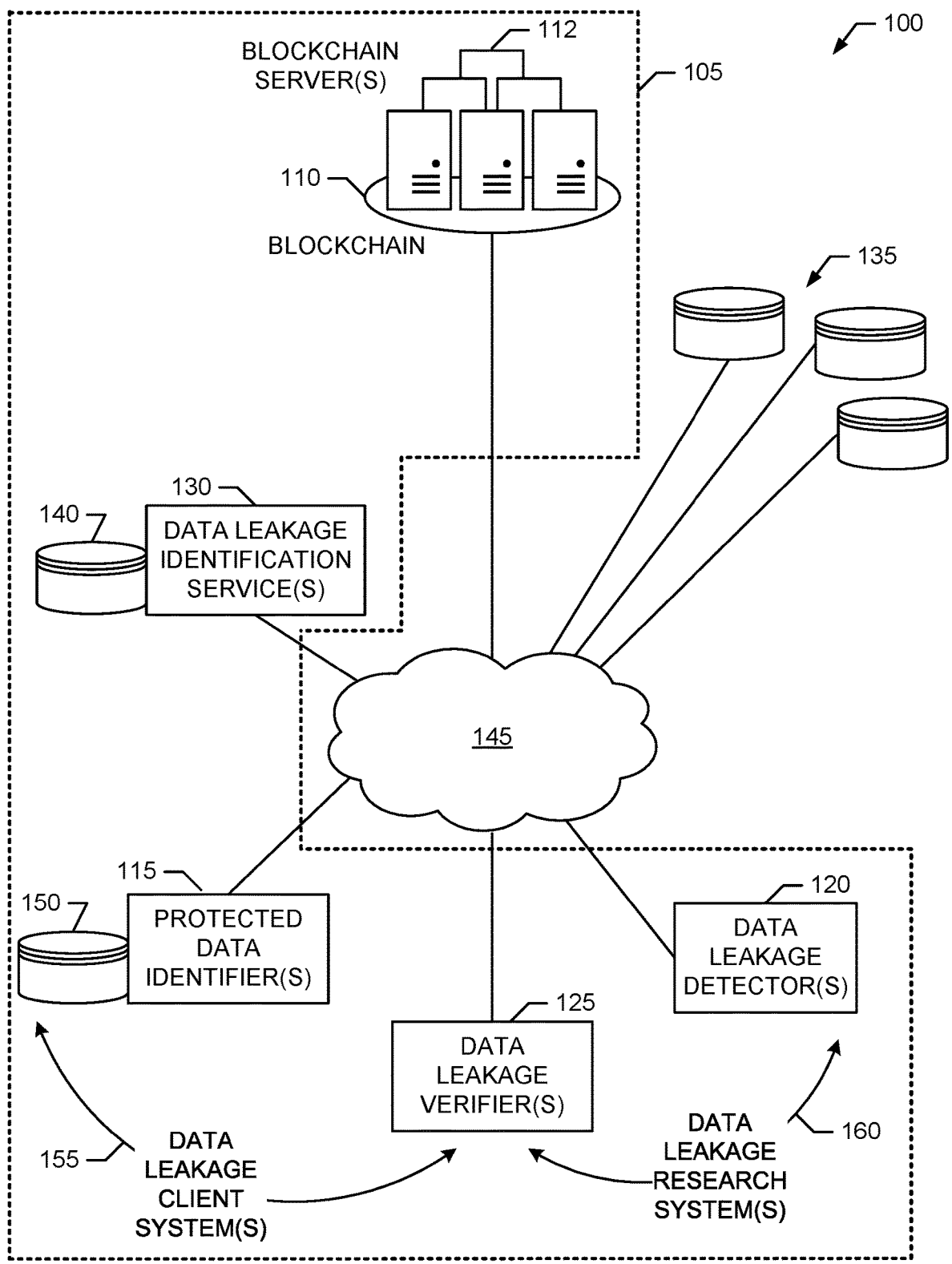
FIG. 1 is a block diagram of an example data leakage mitigation system constructed based on an example blockchain in accordance with teachings of this disclosure and shown in an example environment of use.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to perform data leakage mitigation with a blockchain are disclosed herein. Example data leakage detection apparatus disclosed herein include a fingerprinter to generate a first data fingerprint of a first data item accessed from a data source. Disclosed example data leakage detection apparatus also include a blockchain scanner to scan a blockchain to detect whether a first blockchain record includes a second data fingerprint (e.g., a protected data fingerprint) that matches the first data fingerprint of the first data item. Disclosed example data leakage detection apparatus further include a blockchain writer to write a second blockchain record to the blockchain when the second data fingerprint matches the first data fingerprint. The second blockchain record is to indicate the first data item is associated with a data leak of a protected data item represented by the second data fingerprint. In some examples, the second blockchain record includes the first data fingerprint and a first timestamp.

In some disclosed examples, the blockchain writer includes metadata in the second blockchain record. In some examples, the metadata is to identify a location of the first data item. In some such examples, the metadata includes a uniform resource locator of the first data item. Additionally or alternatively, in some such examples, the metadata is first metadata, and the blockchain writer includes second metadata in the second blockchain record. In some examples, the second metadata is to identify a type of the second blockchain record.

In some disclosed examples, the blockchain includes blockchain records of a first type associated with protected data items and blockchain records of a second type associated with leaked data items. In some such examples, the blockchain scanner is to limit comparison of the first data fingerprint of the first data item to respective data fingerprints included in the blockchain records of the first type. In some such examples, the first data item is designated for data leakage protection, and when the first data fingerprint of the first data item does not match any of the data fingerprints included in the blockchain records of the first type, the blockchain writer is to write a third blockchain record to the blockchain to indicate the first data item is another protected data item. In some such examples, the third blockchain record includes the first data fingerprint and the first timestamp. Furthermore, in some such examples, the blockchain writer includes metadata in the third blockchain record. For example, the metadata can include ownership information associated with the first data item.

Some disclosed examples further include a notifier to issue a data leakage notification associated with the protected data item when the second data fingerprint matches the first data fingerprint.

Example data leakage detection verification apparatus disclosed herein include a blockchain monitor to monitor a blockchain to detect a blockchain record associated with a data leak of a protected data item. In some examples, the blockchain record includes a first data fingerprint of a leaked data item corresponding to the protected data item, a timestamp, and location metadata to identify a location of the leaked data item. Disclosed example data leakage verification apparatus also include a data retriever to access the leaked data item from a data source based on the location metadata, and a fingerprinter to generate a second data fingerprint of the leaked data item. Disclosed example data leakage verification apparatus further include a notifier to issue a data leakage notification associated with the protected data item when the second data fingerprint matches the first data fingerprint.

In some disclosed examples, the blockchain record is a first blockchain record, and the blockchain monitor is to monitor the blockchain for inclusion of blockchain records having respective data fingerprints that match a third data fingerprint (e.g., a protected data fingerprint) associated with the protected data item. In such an example, the first data fingerprint of the first blockchain record matches the third data fingerprint associated with the protected data item.

Additionally or alternatively, in some disclosed examples, the location metadata includes a uniform resource locator of the leaked data item.

Additionally or alternatively, in some disclosed examples, the blockchain is to include blockchain records of a first type associated with protected data items and blockchain records of a second type associated with data leak detections, and the blockchain monitor is to limit monitoring of the blockchain to inclusion of the blockchain records of the second type.

These and other example methods, apparatus, systems and articles of manufacture (e.g., physical storage media) to perform data leakage mitigation with a blockchain are disclosed in further detail below.

As mentioned above, known data leakage prevention technology is often focused on detecting unauthorized data access of protected data items while the protected data items remain in a trusted domain. Such protected data items can include, for example, private, sensitive and/or confidential data records, documents, files, etc. The trusted domain can correspond to a server, server cluster, network, database, cloud service, etc., associated with a data owner (e.g., an individual, a company, an institution, etc.), a data service (e.g., such as a drive service, a cloud data center, etc.), etc. If an unauthorized data access is successful and a protected data item leaves the trusted domain, prior options to detect and mitigate the data leakage may be limited, and may involve sharing the protected data item with a third-party to enable use of the third-party's data leakage detection solution to search for the protected data item on data sites (e.g., publicly accessible data sites, such as on the dark web) outside the trusted domain. However, such sharing of the protected data item may be undesirable due to its private, sensitive and/or confidential nature, which may limit the choice of third-parties to trusted third parties, or cause the data owner to forego enlisting a third-party solution altogether, which may delay detection of the unauthorized data access until after the associated protected data item, or a portion thereof, has been leaked onto a public site for some period of time.

Unlike such prior solutions, disclosed example data leakage mitigation solutions employ a blockchain to store fingerprints of protected data items. For example, the fingerprints of protected data items are generated and stored individually or in batches in records of the blockchain. The protected data fingerprints stored in the blockchain can be compared to fingerprints of external data items accessed on other data sources, such as public websites, public data services, etc., to determine whether any of those external data items correspond to any of the protected data items represented by the protected data fingerprints stored in the blockchain and, thus, may be associated with a leak of one or more of those protected data items. As such, disclosed example data leakage mitigation solutions leverage the blockchain by publicly storing the fingerprints of private, protected data items by data owners. The fingerprints in the blockchain can be used by any third party to detect unauthorized release of the protected data items outside the trusted domains of the data owners without the need to share the actual protected data items with the third party. As such, the fingerprints, but not the protected data items, are accessible, and the fingerprints cannot be used to reconstruct the actual protected data items.

Thus, disclosed example data leakage mitigation solutions may leverage any third-party service, even untrusted services, to detect leakage of a protected data item outside the trusted domain of that protected data item. For example, a centralized data leakage mitigation service can utilize the disclosed example data leakage mitigation solutions to search multiple data sources (e.g., public websites, public data services, the dark web, etc.) and compare the protected data fingerprints in the blockchain with fingerprints of data items found on those data sources to identify leaked data items corresponding to the protected data items represented by the protected data fingerprints in the blockchain. As another example, existing and/or new data services, such as content hosting services (e.g., Dropbox™, a cloud platform provided by Amazon Web Services, Inc®, etc.), drive services (e.g., Google Drive™, Microsoft® OneDrive®, etc.), etc., could utilize one or more of the disclosed example data leakage mitigation solutions to search their respective data sources/stores for data items having fingerprints matching the protected data fingerprints in the blockchain to identify leaked data items on their respective services, thereby implementing respective distributed data leakage mitigation services. Moreover, such distributed data leakage mitigation services can add records to the blockchain containing fingerprints representative of leaked data items to share data leakage detection information amongst each other without sharing the actual protected data items themselves. Thus, disclosed example data leakage mitigation solutions can increase the number of third parties involved in data leakage detection, thereby increasing the likelihood of detecting a leaked data and reducing the amount of the time the leaked data is publicly available before mitigating action can be taken.

Disclosed example data leakage mitigation solutions also enable creation of data leakage verification solutions, which enable an independent third party (e.g., a research organization) to verify that a claimed data leak actually occurred. For example, if the independent third party detects potential leaked data on a public site, the independent third party can generate a fingerprint of the potential leaked data, store the fingerprint in the blockchain along with an indication that the data item represented by the fingerprint is associated with a potential data leak. The data owner can then compare that fingerprint from the blockchain with an actual fingerprint of the protected data item allegedly corresponding to the data leak to verify whether the data has been leaked without the need for either party to exchange the actual data item itself. Thus, disclosed example solutions enable improved data leakage detection and verification that avoids the need to divulge any of the actual data being protected.

Turning to the figures, a block diagram of an example data leakage mitigation system 105 constructed to mitigate data leakage with an example blockchain 110 in accordance with teachings of this disclosure is illustrated in FIG. 1 in an example environment of use 100. The data leakage mitigation system 105 includes one or more example blockchain servers 112 to implement the blockchain 110. The data leakage mitigation system 105 also includes one or more example protected data identifiers 115, one or more example data leakage detectors 120, one or more example data leakage verifiers 125, and/or one or more example data leakage identification services 130. As disclosed in further detail below, the protected data identifier(s) 115, the data leakage detector(s) 120, the data leakage verifier(s) 125, and/or the data leakage identification service(s) 130 operate to detect and/or verify the presence of leaked data on one or more example external (e.g., public) data sources 135, and/or on one or more example data sources 140 associated with the data leakage identification service(s) 130.

In the example environment 100 of FIG. 1, the blockchain server(s) 112, the protected data identifier(s) 115, the data leakage detector(s) 120, the data leakage verifier(s) 125, the data leakage identification service(s) 130 and the data source(s) 135 are in communication via an example network 145. The network 145 of the illustrated example can be implemented by any number and/or types of communication networks. For example, the network 145 can be implemented by one or more wired/cabled networks, one or more wireless networks (e.g., mobile cellular networks, satellite networks, etc.), one or more proprietary networks, one or more public networks (e.g., such as the Internet), etc., or any combination thereof.

The example data leakage mitigation system 105 of FIG. 1 includes the protected data identifier(s) 115 to identify protected data items for which data leakage mitigation is to be performed by the example system 105. In the illustrated example, the protected data identifier(s) 115 identify protected data items stored in, conveyed by and/or otherwise associated with corresponding example protected data source(s) 150. The protected data source(s) 150 are associated respectively with the protected data identifier(s) 115. For example, a protected data identifier 115 in the data leakage mitigation system 105 of the illustrated example may be associated with a data owner, such as an individual, a company, an institution, etc. In some such examples, the protected data source 150 associated with that protected data identifier 115 may correspond to one or more servers, server clusters, networks, databases, cloud services, etc., or combination(s) thereof residing physically and/or logically in a trusted domain established by the data owner. The protected data items identified by the protected data identifier 115 can correspond to data records, documents, files, etc., accessible from the protected data source 150.

In the illustrated example, a protected data identifier 115 selects a protected data item from the protected data source 150 based on user input, a policy, network setting, drive settings, etc. For example, the protected data identifier 115 may specify individual data items to be protected, directories/folders of data items to be protected, network nodes for which data items are to be protected, etc. Once a protected data item is selected, the protected data identifier 115 generates a protected data fingerprint to represent the protected data item. In some examples, the protected data fingerprint is noninvertible such that the protected data item cannot be recovered from the protected data fingerprint. In the illustrated example, the protected data identifier 115 includes the protected data fingerprint in a timestamped blockchain record, and transmits the timestamped blockchain record to the blockchain server(s) 112 for addition to the blockchain 110. For example, the timestamped blockchain record may include a timestamp indicating when the timestamped blockchain record for the protected data item was created and/or added to the blockchain 110. As such, the timestamp can be used to identify when a data owner claimed ownership of the protected data item and designated the protected data item for data leakage mitigation. Additionally or alternatively, in some examples, the timestamped blockchain record created by the protected data identifier 115 for a given protected data item may include metadata. For example, the metadata data can include ownership information associated with the protected data item (e.g., to permit the data owner of the protected data item to be contacted directly or indirectly if a data breach is detected), record type metadata (e.g., a flag, header, etc.) to identify that the timestamped blockchain record is a type of blockchain record associated with protected data items, etc., or any combination thereof.

The example data leakage mitigation system 105 of FIG. 1 includes the data leakage detector(s) 120 to detect leaked data items on the data source(s) 135. For example, the data source(s) 135 can correspond to public web sites, file sharing services, data mirroring services, public cloud storage services, public database servers, etc. In the illustrated example, a data leakage detector 120 detects whether a data item available on a data source 135 is a leaked data item by accessing (e.g., downloading, reading, retrieving, etc.) the data item from the data source 135 and fingerprinting the accessed data item to generate an accessed data fingerprint representative of the accessed data item. The data leakage detector 120 then scans the blockchain records of the blockchain 110 to compare the accessed data fingerprint with the respective protected data fingerprints included in the corresponding scanned blockchain records. If the data leakage detector 120 detects a match between the accessed data fingerprint and a protected data fingerprint included in a scanned blockchain record, the data leakage detector 120 determines the accessed data item from the data source 135 is a leaked data item corresponding to the protected data item represented by the matching protected data fingerprint.

Accordingly, when such a match is detected, the data leakage detector 120 reports the leaked data item. In some examples, the data leakage detector 120 reports the leaked data item by creating a timestamped blockchain record including the data fingerprint representing the leaked data item, and transmits the timestamped blockchain record to the blockchain server(s) 112 for addition to the blockchain 110. For example, the timestamped blockchain record may include a timestamp indicating when the timestamped blockchain record for the leaked data item was created and/or added to the blockchain 110. As such, the data fingerprint included in the timestamped blockchain record for the leaked data item will match the data fingerprint included in the timestamped blockchain record for the protected data item. However, the timestamp included in the timestamped blockchain record for the leaked data item will have a later time value than the timestamp included in the timestamped blockchain record for the protected data item. Thus, the later timestamp can be used to determine that the timestamped blockchain record for the leaked data item was added to the blockchain 110 after the timestamped blockchain record for the protected data item and, thus, represents a data leak of the protected data item.

Additionally or alternatively, in some examples, the timestamped blockchain record created by the data leakage detector 120 for a given leaked data item may include metadata. For example, the metadata data can include a location, such as a uniform resource locator (URL), of the leaked data item (e.g., to permit the leaked data item to be accessed from the data source 135 and verified to be a data leak, as described in further detail below), record type metadata (e.g., a flag, header, etc.) to identify that the timestamped blockchain record is a type of blockchain record associated with leaked data items, etc., or any combination thereof.

The example data leakage mitigation system 105 of FIG. 1 includes the data leakage verifier(s) 125 to verify leaked data items detected by the data leakage detector(s) 120. In the illustrated example, a data leakage verifier 125 monitors the blockchain 110 to detect the addition of new blockchain records (e.g., having timestamps with time values later than a prior monitoring time) to the blockchain 110. If a new blockchain record is detected and represents a leaked data item (e.g., based on metadata included in the blockchain record, the timestamp of the blockchain record being later than the timestamp of another blockchain record having a matching data fingerprint, etc.), the data leakage verifier 125 determines whether a location (e.g., URL) of the leaked data item is included in the blockchain record. If the location metadata is available, the data leakage verifier 125 uses the location metadata to access the leaked data item from the data source(s) 135. The data leakage verifier 125 then generates a data fingerprint of the leaked data item and compares the generated data fingerprint with the data fingerprint included in the blockchain record and/or a stored data fingerprint representative of the protected data item corresponding to the leaked data item. If the compared fingerprints match, the data leakage verifier 125 issues a data leakage notification associated with the protected data item (e.g., a notification to indicate a data leak of the protected data item has been verified). For example, the data leakage notification can be any type of communication, such as an email, a text, a social media post, a bulletin board post, etc., targeted to the data owner of the protected item, to a public forum, etc., or any combination thereof.

As shown in the illustrated example of FIG. 1, in some examples, example protected data identifier(s) 115 and example data leakage verifier(s) 125 can be combined into example data leakage client system(s) 155. For example, a data leakage client system 155 can include a protected data identifier 115 to identify protected data items to the blockchain 110 for a given data owner, and a data leakage verifier 125 to verify that a leaked data item represented by a blockchain record added to the blockchain 110 corresponds to an identified protected data item associated with that data owner. Additionally or alternatively, in some examples, example data leakage detector(s) 120 and example data leakage verifier(s) 125 can be combined into example data leakage research system(s) 160. For example, such a data leakage research system 160 can be used by a third-party research to detect and verify leaked data items corresponding to protected data items identified in the blockchain 110.

In some examples, the data leakage mitigation system 105 of FIG. 1 includes the data leakage identification service(s) 130 to provide integrated data leak detection for clients of a data service, such as a cloud drive service (e.g., Google Drive™, Microsoft® OneDrive®, etc.), a content hosting service (e.g., Dropbox™, a cloud platform provided by Amazon Web Services, Inc®, etc.), etc. For example, a data leakage identification service 130 can include aspects of a protected data identifier 115 to identify protected data items to the blockchain 110 for clients of the data service, and aspects of the data leakage detector 120 to detect leaked data items within the domain of the data service (e.g., on the data source(s) 140 of the data service). Thus, the data leakage identification service 130 enables a data service to provide data leakage mitigation features for clients, as well as enforce policies to prevent clients from sharing leaked data via the data service. Moreover, in some examples, multiple data services having respective data leakage identification services 130 may cooperate together through the blockchain 110 to protect data items for their clients collectively.

As disclosed above, the example data leakage mitigation system 105 of FIG. 1 includes the blockchain 110 implemented by the blockchain server(s) 112. The blockchain 110 includes blocks containing timestamped blockchain records to identify protected data items and detected leaked data items corresponding to the protected data items. As such, in some examples, the blockchain 110 includes at least two types of timestamped blockchain records (e.g., specified by metadata included in the blockchain records), such as a first type associated with protected data items and a second type associated with data leak detections. The timestamped blockchain records include data fingerprints rather the actual data items (or portions thereof) themselves, thereby avoiding the need to share protected data items outside their respective trusted domains. Furthermore, the timestamped blockchain records include timestamps to identify when the records are created and/or added to the blockchain 110. Because existing blocks of the blockchain are immutable, the timestamps can be used to resolve disputes concerning, for example, ownership of protected data items (e.g., the record associated with the earliest timestamp may have a rebuttable presumption of being associated with the data owner), who was the first detector of a leaked data item, etc.

In some examples, the blockchain server(s) 112 include a centralized blockchain server (possibly with one or more backup servers) to implement a centralized blockchain to store the timestamped blockchain records. In some examples, the blockchain server(s) 112 include multiple distributed blockchain servers to implement a distributed blockchain (e.g., based on a proof-of-work mechanism, a proof-of-stake mechanism, etc.) to store the timestamped blockchain records. The blockchain server(s) 112 of the illustrated example may be implemented by any types and/or number of computing devices, servers, data centers, cloud services, etc.

The example data leakage mitigation system 105 of FIG. 1 can include any numbers of blockchains 110, blockchain server(s) 112, protected data identifier(s) 115, data leakage detector(s) 120, data leakage verifier(s) 125 and/or data leakage identification service(s) 130. Also, although the example data leakage mitigation system 105 of FIG. 1 is illustrated as including the protected data identifier(s) 115, the data leakage detector(s) 120, the data leakage verifier(s) 125 and the data leakage identification service(s) 130, in other examples, the data leakage mitigation system 105 may omit one or more of the protected data identifier(s) 115, the data leakage detector(s) 120, the data leakage verifier(s) 125 and the data leakage identification service(s) 130. For example, another example implementation of the data leakage mitigation system 105 could include just the data leakage identification service(s) 130 to detect and/or verify the presence of leaked data on the example data source(s) 140 associated with the data services implementing the data leakage identification service(s) 130. In another example, the data leakage mitigation system 105 could include just the protected data identifier(s) 115 and the data leakage detector(s) 120 to detect the presence of leaked data on the external data source(s) 135. In yet a further example, the data leakage mitigation system 105 could include just the protected data identifier(s) 115, the data leakage detector(s) 120 and the data leakage verifier(s) 125 to detect and verify the presence of leaked data on the external data source(s) 135. Other example implementations of the data leakage mitigation system 105 could include other combinations of the protected data identifier(s) 115, the data leakage detector(s) 120, the data leakage verifier(s) 125 and/or the data leakage identification service(s) 130.

Figure 2:
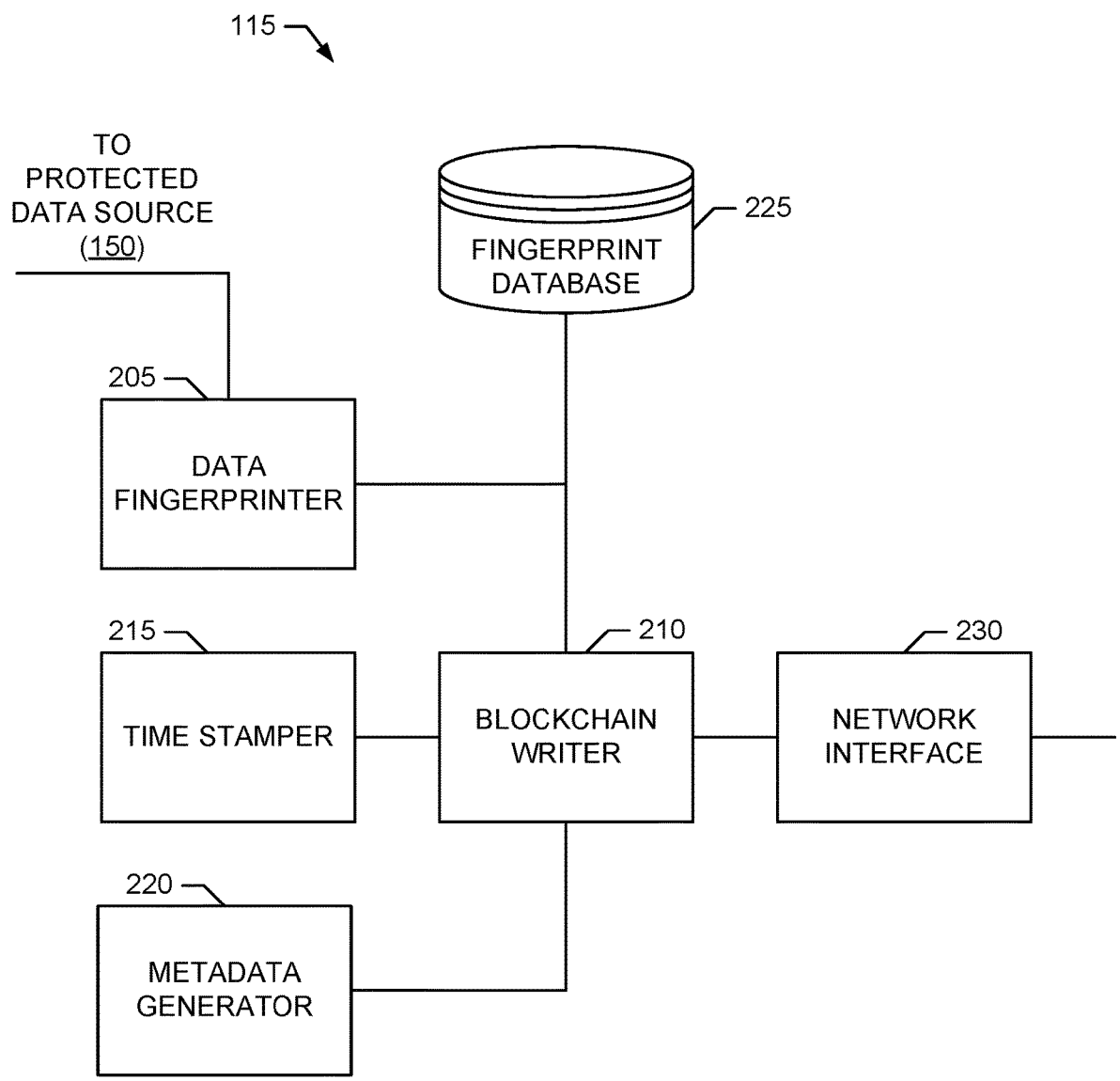
FIG. 2 is a block diagram of an example implementation of the protected data identifier of FIG. 1.

A block diagram of an example implementation of one or more of the protected data identifiers 115 of FIG. 1 is illustrated in FIG. 2. The example protected data identifier 115 of FIG. 2 includes an example data fingerprinter 205, an example blockchain writer 210, an example time stamper 215, an example metadata generator 220, an example fingerprint database 225, and an example network interface 230. In the illustrated example of FIG. 2, the network interface 230 is implemented by any network interface device, card, chip, etc., capable of interfacing with the network 145 of FIG. 1.

The example protected data identifier 115 of FIG. 2 includes the data fingerprinter 205 to generate a data fingerprint of a protected data item accessed from the protected data source 150 associated with the protected data identifier 115. For example, the protected data item may be selected based on user input, a policy, network setting, drive settings, etc., as described above. The data fingerprinter 205 can implement any data fingerprinting algorithm, or combination of data fingerprinting algorithms, to generate a data fingerprint of the protected data item, which is also referred to herein as a protected data fingerprint of the protected data item. For example, the data fingerprinter 205 can process the data included in the accessed, protected data item, or a portion thereof, with one or more of a cryptographic hash function, a fuzzy hash function, a Rabin fingerprint algorithm, etc., to generate a sequence of data symbols, bits, etc., that form a data fingerprint used to represent the protected data item. In some example, the data fingerprinting algorithm(s) implemented by the data fingerprinter 205 is(are) noninvertible such that the protected data item is unable to be reconstructed from the protected data fingerprint generated for that protected data item.

The example protected data identifier 115 of FIG. 2 includes the blockchain writer 210 to create a timestamped blockchain record to store the protected data fingerprint generated by the data fingerprinter 205 for a selected protected data item. The blockchain record created by the blockchain writer 210 may have any appropriate data format, data structure, etc., capable of storing the protected data fingerprint and a timestamp generated by the time stamper 215. In some examples, the blockchain record created by the blockchain writer 210 also includes metadata generated by the metadata generator 220. In the illustrated example, the blockchain writer 210 uses the network interface 230 to write (e.g., send, transmit, upload, etc.) the timestamped blockchain record including the protected data fingerprint, timestamp and metadata (if present) to the blockchain server(s) 112 for addition to the blockchain 110.

The example protected data identifier 115 of FIG. 2 includes the time stamper 215 to generate a timestamp for inclusion in the blockchain record created by the blockchain writer 210 for a protected data fingerprint representing a selected protected data item. The time stamper 215 can be implemented by any clock, timing oscillator, timer, etc. The time stamper 215 may be structured to output a time value according to any appropriate time format. In some examples, the blockchain writer 210 reads a timestamp from the time stamper 215 for inclusion in the blockchain record when the blockchain writer 210 creates the blockchain record such that the timestamp represents the time at which the blockchain record was created. In some examples, the blockchain writer 210 reads a timestamp from the time stamper 215 for inclusion in the blockchain record when the blockchain writer 210 is about to write the blockchain record to the blockchain 110 such that the timestamp represents the time at which the blockchain record was added to the blockchain 110.

The example protected data identifier 115 of FIG. 2 includes the metadata generator 220 to generate metadata for inclusion in the blockchain record created by the blockchain writer 210 for a protected data fingerprint representing a selected protected data item. The metadata can be formatted in any data format or combinations of data formats, such as binary data, alphanumeric data, etc. In some examples, the metadata generated by the metadata generator 220 includes type information (e.g., a flag, type value, etc.) to identify that a type of the blockchain record is a first type associated with protected data items. Additionally or alternatively, in some examples, the metadata generated by the metadata generator 220 includes ownership information associated with the protected data item represented by the protected data fingerprint to be included in the blockchain record. For example, the ownership information can include one or more of an identity and/or digital signature of the data owner, contact information for the data owner, such as an email address, a website URL, an anonymous contact service (e.g., utilizing an anonymous digital wallet), etc. In some examples, the metadata generated by the metadata generator 220 can include any other information in addition to, or as an alternative to, the record type information and/or the ownership information.

The example protected data identifier 115 of FIG. 2 includes the fingerprint database 225 to store the protected data fingerprints generated for the protected data items accessed from the protected data source 150. The fingerprint database 225 can store the protected data fingerprints in any appropriate data format, data structure, etc. As such, the fingerprint database 225 can be implemented by any one or more memories, storage devices, servers, etc., or any combination thereof. In some examples, the fingerprint database 225 also maps (e.g., links) the protected data fingerprints stored therein to respective information identifying the protected data items corresponding respectively to the stored, protected data fingerprints. Such identifying information can include, for example, a filename, directory location, network location, etc., of a particular protected data item in the protected data source 150 of the data owner. Such mappings of protected data fingerprints to corresponding protected data items enables the data owner (e.g., through use of a data leakage verifier 125, as described below) to determine which protected data item corresponds to a particular protected data fingerprint determined to match a data fingerprint representative of a leaked data item.

Figure 3:
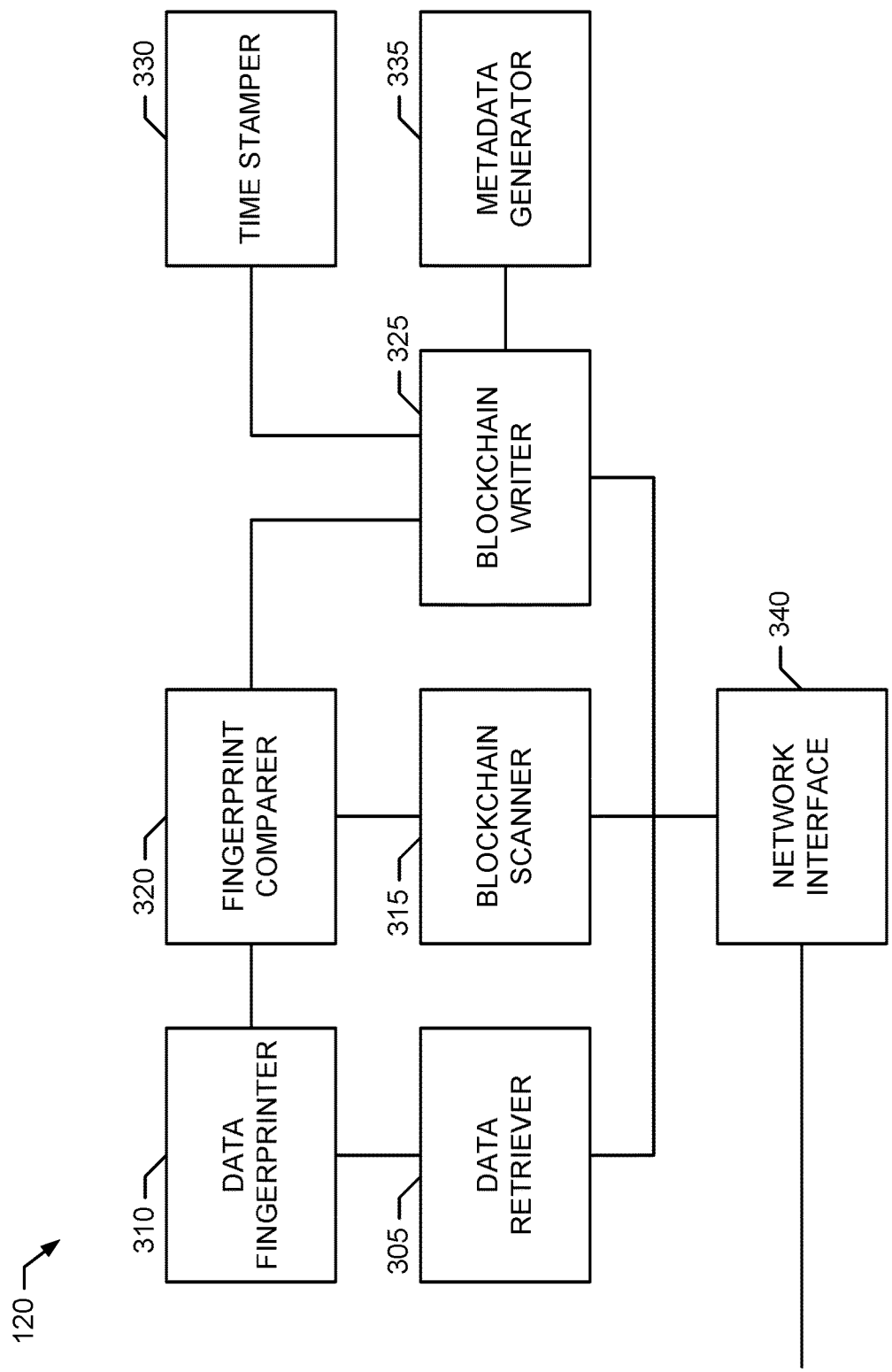
FIG. 3 is a block diagram of an example implementation of the data leakage detector of FIG. 1.

A block diagram of an example implementation of one or more of the data leakage detectors 120 of FIG. 1 is illustrated in FIG. 3. The example data leakage detector 120 of FIG. 3 includes an example data retriever 305, an example data fingerprinter 310, an example blockchain scanner 315, an example fingerprint comparer 320, an example blockchain writer 325, an example time stamper 330, an example metadata generator 335, and an example network interface 340. In the illustrated example of FIG. 3, the network interface 340 is implemented by any network interface device, card, chip, etc., capable of interfacing with the network 145 of FIG. 1.

The example data leakage detector 120 of FIG. 3 includes the data retriever 305 to access, via the network interface 340, data items on the external data source(s) 135 to check whether the data items correspond to protected data items represented in the blockchain 110. For example, the data retriever 305 can be implemented by one or more of a web crawler or similar utility to scan and retrieve data items from the data source(s) 135, a search engine or similar utility to search for and retrieve data items from one or more of the data source(s) 135 based on specified search criteria, and/or any other data retrieving mechanism. In some examples, a data item accessed (retrieve) by the data retriever 305 is referred to as a retrieved data item, an accessed data item, a public data item, etc.

The example data leakage detector 120 of FIG. 3 includes the data fingerprinter 310 to generate a data fingerprint of a data item accessed by the data retriever 305 from the data source(s) 135. The data fingerprinter 310 can implement any data fingerprinting algorithm, or combination of data fingerprinting algorithms, to generate a data fingerprint of the retrieved data item. For example, the data fingerprinter 310 can process the data included in the retrieved data item, or a portion thereof, with one or more of a cryptographic hash function, a fuzzy hash function, a Rabin fingerprint algorithm, etc., to generate a sequence of data symbols, bits, etc., that form a data fingerprint used to represent the retrieved data item. In some example, the data fingerprinting algorithm(s) implemented by the data fingerprinter 310 are noninvertible such that the retrieved data item is unable to be reconstructed from the data fingerprint generated for that retrieved data item. In some examples, the data fingerprinter 310 implements the same data fingerprinting algorithm, or combination of data fingerprinting algorithms, as the data fingerprinter 205 of the protected data identifier 115 such that data fingerprints generated by the data fingerprinter 205 and the data fingerprinter 310 for the same data item would match. As such, the data fingerprinter 310 is an example of means for generating a data fingerprint of a data item accessed from a data source.

The example data leakage detector 120 of FIG. 3 includes the blockchain scanner 315 to scan (e.g., read), via the network interface 340, the protected blockchain records stored in the blockchain 110. In some examples in which the blockchain 110 stores blockchain records of multiple types including a first type associated with protected data items and a second type associated with leaked data items (e.g., as identified by type information, such as a flag, value, etc., included in the data records), and/or other types, the blockchain scanner 315 limits the scanning (e.g., reading) of the blockchain 110 to blockchain records of the first type associated with protected data items (e.g., by reading the metadata included in the blockchain records and skipping blockchain records not of the type associated with protected data items). In the illustrated example, for a given scanned blockchain record from the blockchain 110, the blockchain scanner 315 invokes the fingerprint comparer 320 to compare the protected data fingerprint stored in the scanned blockchain record with the data fingerprint generated by the data fingerprinter 310 for the data item accessed by the data retriever 305 from the data source(s) 135. As such, the blockchain scanner 315 is an example of means for scanning a blockchain to detect whether a blockchain record includes a data fingerprint that matches the data fingerprint of a data item.

The example data leakage detector 120 of FIG. 3 includes the fingerprint comparer 320 to compare the protected data fingerprint stored in the blockchain record scanned by the blockchain scanner 315 with the data fingerprint generated by the data fingerprinter 310 for the data item accessed by the data retriever 305 from the external data source(s) 135. The fingerprint comparer 320 can perform any appropriate comparison technique to compare the protected data fingerprint with the data fingerprint of the retrieved data item. For example, the fingerprint comparer 320 can perform one or more of a bitwise comparison, a correlation, a difference/subtraction operation, etc. If the fingerprint comparer 320 detects a match between the data fingerprint of the retrieved data item and the protected data fingerprint included in the scanned blockchain record, the fingerprint comparer 320 determines the retrieved data item is a leaked data item corresponding to the protected data item represented by the matching protected data fingerprint and, thus, invokes the blockchain writer 325 to report the leaked data item. The data fingerprint of a retrieved data item determined to be a leaked data item is also referred to herein as a leaked data fingerprint.

The example data leakage detector 120 of FIG. 3 includes the blockchain writer 325 to report the leaked data item by creating a timestamped blockchain record to store the leaked data fingerprint representing the leaked data item, and using the network interface 340 to write (e.g., send, transmit, upload, etc.) the timestamped blockchain record including the leaked data fingerprint representing the leaked data item to the blockchain server(s) 112 for addition to the blockchain 110. The blockchain record created by the blockchain writer 325 may have any appropriate data format, data structure, etc., capable of storing the leaked data fingerprint of the leaked data item and a timestamp generated by the time stamper 330. In some examples, the blockchain record created by the blockchain writer 325 also includes metadata generated by the metadata generator 335. As such, the blockchain writer 325 is an example of means for writing a blockchain record to a blockchain to indicate a data item accessed from a data source is associated with a leak of a protected item.

The example data leakage detector 120 of FIG. 3 includes the time stamper 330 to generate a timestamp for inclusion in the blockchain record created by the blockchain writer 325 for the leaked data fingerprint. The time stamper 330 can be implemented by any clock, timing oscillator, timer, etc., and structured to output a time value according to any appropriate time format. In some examples, the blockchain writer 325 reads a timestamp from the time stamper 330 for inclusion in the blockchain record when the blockchain writer 325 creates the blockchain record such that the timestamp represents the time at which the blockchain record was created. In some examples, the blockchain writer 325 reads a timestamp from the time stamper 330 for inclusion in the blockchain record when the blockchain writer 325 is about to write the blockchain record to the blockchain 110 such that the timestamp represents the time at which the blockchain record was added to the blockchain 110. In either case, the timestamp included in the time-stamped blockchain record for the leaked data item will have a later time value than the timestamp included in the timestamped blockchain record for the corresponding protected data item. Thus, the later timestamp can be used to determine that the timestamped blockchain record for the leaked data item was added to the blockchain 110 after the timestamped blockchain record for the protected data item and, thus, represents a data leak of the protected data item.

The example data leakage detector 120 of FIG. 3 includes the metadata generator 335 to generate metadata for inclusion in the blockchain record created by the blockchain writer 325 for the leaked data fingerprint representing the leaked data item. The metadata can be formatted in any data format or combinations of data format, such as binary data, alphanumeric data, etc. In some examples, the metadata generated by the metadata generator 335 includes a flag, type value, etc., to identify that a type of the blockchain record is a second type associated with leaked data items. Additionally or alternatively, in some examples, the metadata generated by the metadata generator 335 includes a location, such as a URL, of the leaked data item to permit the leaked data item to be accessed from the data source(s) 135 and verified to be a data leak. In some examples, the metadata generated by the metadata generator 335 can include any other information in addition to, or as an alternative to, the record type information and/or the location of the leaked data item.

Figure 4:
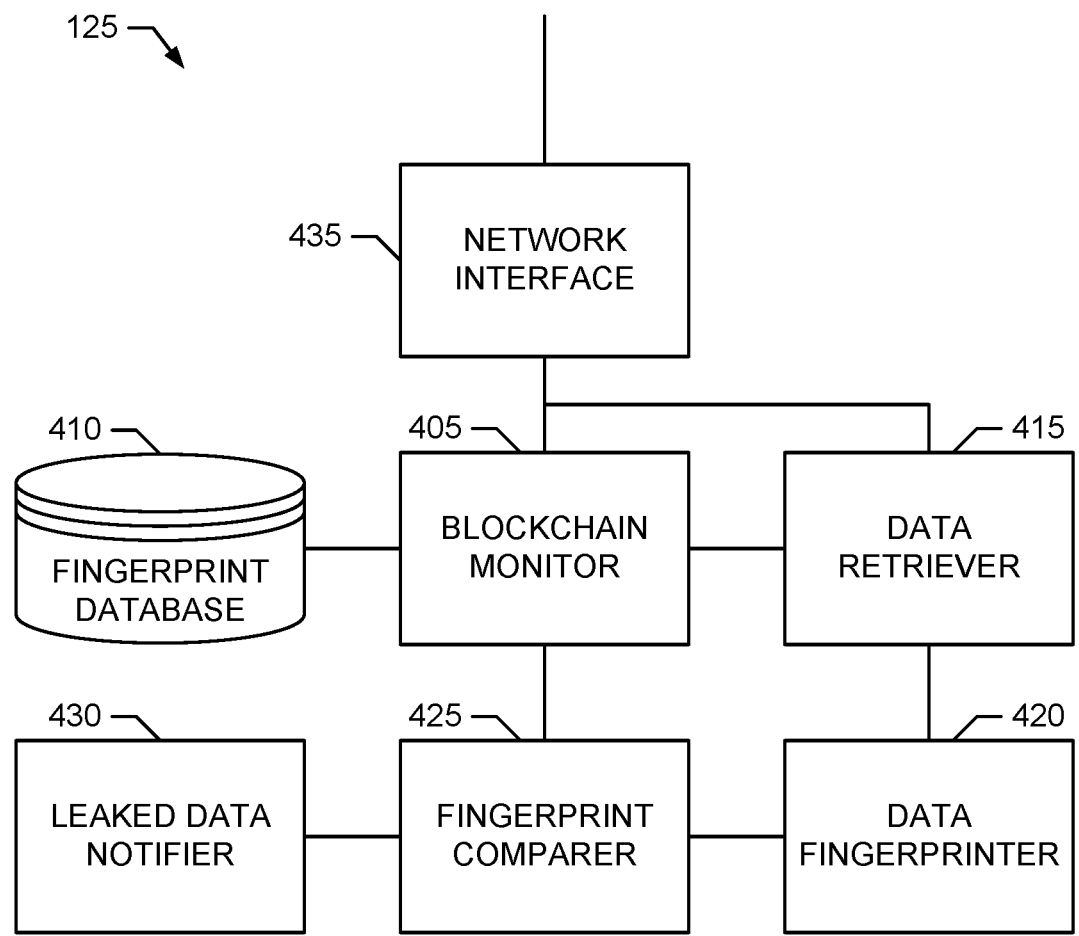
FIG. 4 is a block diagram of an example implementation of the data leakage verifier of FIG. 1.

A block diagram of an example implementation of one or more of the data leakage verifiers 125 of FIG. 1 is illustrated in FIG. 4. The example data leakage verifier 125 of FIG. 4 includes an example blockchain monitor 405, an example fingerprint database 410, an example data retriever 415, an example data fingerprinter 420, an example fingerprint comparer 425, an example leaked data notifier 430, and an example network interface 435. In the illustrated example of FIG. 4, the network interface 435 is implemented by any network interface device, card, chip, etc., capable of interfacing with the network 145 of FIG. 1.

The example data leakage verifier 125 of FIG. 4 includes the blockchain monitor 405 to monitor, via the network interface 435, the blockchain 110 to detect the addition of new blockchain records (e.g., having timestamps with time values later than a prior monitoring time) to the blockchain 110. In some examples in which the blockchain 110 stores blockchain records of multiple types including a first type associated with protected data items and a second type associated with leaked data items (e.g., as identified by metadata including type information, such as a flag, value, etc., included in the data records), and/or other types, the blockchain monitor 405 limits the monitoring of the blockchain 110 to the addition of new blockchain records of the second type associated leaked data items (e.g., by reading the metadata included in the new blockchain records and skipping blockchain records not of the type associated with leaked data items). In some examples, the blockchain monitor 405 additionally or alternatively limits the monitoring of the blockchain 110 for the addition of new blockchain records having leaked data fingerprints matching one or more protected data fingerprints stored in the fingerprint database 410. If the blockchain monitor 405 detects a new blockchain record associated with leaked data items (e.g., based on the metadata in the blockchain record and/or the timestamp of the blockchain record being later than the timestamp of another blockchain record with a matching data fingerprint) and, in some examples, if the leaked data fingerprint in the blockchain record matches a protected data fingerprint stored in the fingerprint database 410, the blockchain monitor 405 invokes the data retriever 415 to retrieve the leaked data item (e.g., from the external data source(s) 135) for verification. As such, the blockchain monitor 405 is an example of means for monitoring a blockchain to detect a blockchain record associated with a data leak of a protected data item.

The example data leakage verifier 125 of FIG. 4 includes the fingerprint database 410 to store protected data fingerprints for which data leaks are to be monitored and verified. For example, the data leakage verifier 125 of FIG. 4 may include the fingerprint database 410 when the data leakage verifier 125 is associated with a corresponding protected data identifier 115 (e.g., and, thus, is part of a corresponding data leakage client system 155). In some such examples, the fingerprint database 410 and the corresponding fingerprint database 225 of the protected data identifier 115 may be the same database. The fingerprint database 410 can store the protected data fingerprints in any appropriate data format, data structure, etc. As such, the fingerprint database 410 can be implemented by any one or more memories, storage devices, servers, etc., or any combination thereof. In some examples, the fingerprint database 410 also maps (e.g., links) the protected data fingerprints stored therein to respective information identifying the protected data items corresponding respectively to the stored, protected data fingerprints. Such identifying information can include, for example, a filename, directory location, network location, etc., of a particular protected data item in the protected data source 150 of the data owner. Such mappings of protected data fingerprints to corresponding protected data items enable the data leakage verifier 125 to determine which protected data item corresponds to the particular protected data fingerprint matching the leaked data fingerprint.

The example data leakage verifier 125 of FIG. 4 includes the data retriever 415 to access, via the network interface 435, a leaked data item associated with a monitored blockchain record from the data source(s) 135. For example, the data retriever 415 can be implemented by one or more of a download utility to retrieve the leaked data item, a search engine or similar utility to search for and retrieve the leaked data item from the data source(s) 135, etc. In some examples, the data retriever 415 determines whether a location (e.g., URL) of the leaked data item is included in the monitored blockchain record. If the location metadata is available, the data retriever 415 uses the location metadata to access the leaked data item from the data source(s) 135. As such, the data retriever 415 is an example of means for accessing a leaked data item from a data source based on location metadata.

The example data leakage verifier 125 of FIG. 4 includes the data fingerprinter 420 to generate a data fingerprint of the leaked data item retrieved by the data retriever 415 from the data source(s) 135. The data fingerprinter 420 can implement any data fingerprinting algorithm, or combination of data fingerprinting algorithms, to generate a data fingerprint of the leaked data item, which is also referred to herein as a verification data fingerprint of the leaked data item. For example, the data fingerprinter 420 can process the data included in the accessed, leaked data item, or a portion thereof, with one or more of a cryptographic hash function, a fuzzy hash function, a Rabin fingerprint algorithm, etc., to generate a sequence of data symbols, bits, etc., that form a data fingerprint used to represent the leaked data item. In some example, the data fingerprinting algorithm(s) implemented by the data fingerprinter 420 are noninvertible such that the leaked data item is unable to be reconstructed from the verification data fingerprint generated for that leaked data item. In some examples, the data fingerprinter 420 implements the same data fingerprinting algorithm, or combination of data fingerprinting algorithms, as the data fingerprinter 205 of the protected data identifier 115 and the data fingerprinter 310 of the data leakage detector 120 such that data fingerprints generated by the data fingerprinter 205, the data fingerprinter 310 and the data fingerprinter 420 for the same data item would match. As such, the data fingerprinter 420 is an example of means for generating a data fingerprint of a leaked data item.

The example data leakage verifier 125 of FIG. 4 includes the fingerprint comparer 425 to compare the leaked data fingerprint stored in the blockchain record monitored by the blockchain monitor 405 with the verification data fingerprint generated by the data fingerprinter 420 for the leaked data item accessed by the data retriever 415 from the data source(s) 135. The fingerprint comparer 425 can perform any appropriate comparison technique to compare the leaked data fingerprint from the monitored blockchain record with the verification data fingerprint of the retrieved data item. For example, the fingerprint comparer 425 can perform one or more of a bitwise comparison, a correlation, a difference/subtraction operation, etc. If the fingerprint comparer 425 detects a match between the leaked data fingerprint from the monitored blockchain record and the verification data fingerprint of the retrieved data item, the fingerprint comparer 425 determines the leaked data item is verified and, thus, invokes the leaked data notifier 430 to report the leaked data item.

The example data leakage verifier 125 of FIG. 4 includes the leaked data notifier 430 to issue a data leakage notification when a leaked data item is verified by the fingerprint comparer 425. For example, if the leaked data item is verified and also corresponds to a protected data item with a protected data fingerprint in the fingerprint database 410, the leaked data notifier 430 issues the data leakage notification to indicate that the leaked data item is associated with the protected data item and has been verified. In some such examples, the data leakage notification can be any type of communication, such as an email, a text, a social media post, a bulletin board post, etc., targeted to the data owner of the protected item (e.g., based on information mapped to the protected data fingerprint in the fingerprint database 410). In some examples, if the leaked data item is not known to correspond to a particular protected data item (e.g., if monitoring is not limited to blockchain records having leaked data fingerprints matching protected data fingerprints in the fingerprint database 410), the data leakage notification may be a general notification that the leaked data item has been verified, which the leaked data notifier 430 may post to a public forum and/or other destination. As such, the leaked data notifier 430 is an example of means for issuing a data leakage notification associated with a protected data item.

Figure 5:
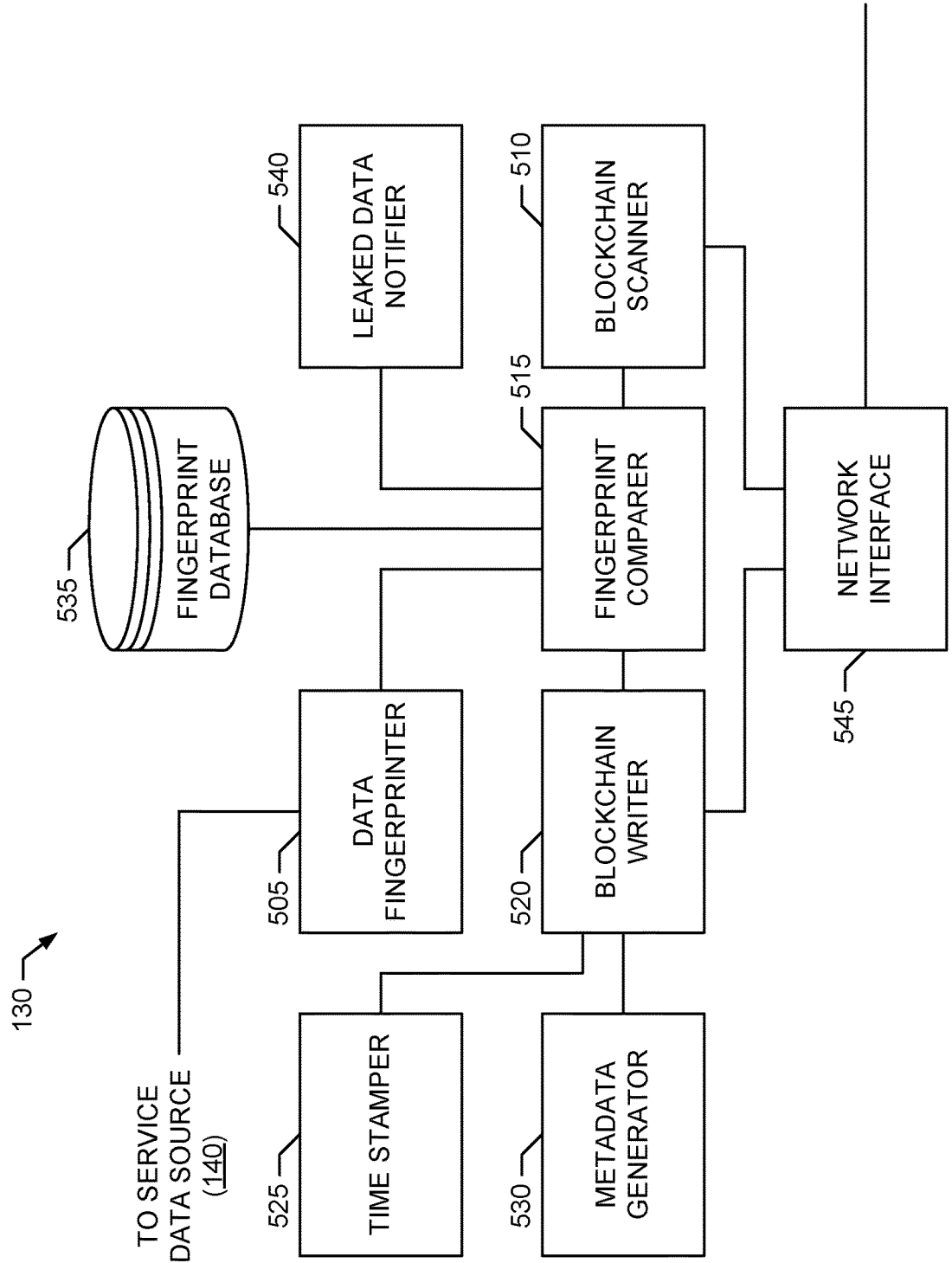
FIG. 5 is a block diagram of an example implementation of the data leakage identification service of FIG. 1.

A block diagram of an example implementation of one or more of the data leakage identification services 130 of FIG. 1 is illustrated in FIG. 5. The example data leakage identification service 130 of FIG. 5 includes an example data fingerprinter 505, an example blockchain scanner 510, an example fingerprint comparer 515, an example blockchain writer 520, an example time stamper 525, an example metadata generator 530, an example fingerprint database 535, an example leaked data notifier 540, and an example network interface 545. In the illustrated example of FIG. 5, the network interface 340 is implemented by any network interface device, card, chip, etc., capable of interfacing with the network 145 of FIG. 1.

The example data leakage identification service 130 of FIG. 5 includes the data fingerprinter 505 to generate a data fingerprint of a data item accessed from the data source(s) 140 of the data service (such as a cloud drive service, a content hosting service, etc.) associated with the data leakage identification service 130. For example, the data fingerprinter 505 may access a data item when the data item is being written to the data source(s) 140 of the data service by an external client, traversing the data source(s) 140 within the data service, being read from the data source(s) 140 of the data service by an external client, etc. The data fingerprinter 505 can implement any data fingerprinting algorithm, or combination of data fingerprinting algorithms, to generate a data fingerprint of the data item. For example, the data fingerprinter 505 can process the data included in the accessed data item, or a portion thereof, with one or more of a cryptographic hash function, a fuzzy hash function, a Rabin fingerprint algorithm, etc., to generate a sequence of data symbols, bits, etc., that form a data fingerprint used to represent the data item. In some example, the data fingerprinting algorithm(s) implemented by the data fingerprinter 205 are noninvertible such that the data item is unable to be reconstructed from the data fingerprint generated for that data item. In some examples, the data fingerprinter 505 implements the same data fingerprinting algorithm, or combination of data fingerprinting algorithms, as the data fingerprinter 205 of the protected data identifier 115, the data fingerprinter 310 of the data leakage detector 120 and the data fingerprinter 420 of the data leakage verifier 125 such that data fingerprints generated by the data fingerprinter 205, the data fingerprinter 310, the data fingerprinter 420 and the data fingerprinter 505 for the same data item would match. As such, the data fingerprinter 420 is an example of means for generating a data fingerprint of a data item accessed from a data source.

The example data leakage identification service 130 of FIG. 5 includes the blockchain scanner 510 to scan (e.g., read), via the network interface 545, the protected blockchain records stored in the blockchain 110. In some examples in which the blockchain 110 stores blockchain records of multiple types including a first type associated with protected data items and a second type associated with leaked data items (e.g., as identified by type information, such as a flag, value, etc., included in the data records), and/or other types, the blockchain scanner 510 limits the scanning (e.g., reading) of the blockchain 110 to blockchain records of the first type associated with protected data items (e.g., by reading the metadata included in the blockchain records and skipping blockchain records not of the type associated with protected data items). In the illustrated example, for a given scanned blockchain record from the blockchain 110, the blockchain scanner 510 invokes the fingerprint comparer 515 to compare the protected data fingerprint stored in the scanned blockchain record with the data fingerprint generated by the data fingerprinter 310 for the data item accessed from the data source(s) 140 of the associated data service. As such, the blockchain scanner 510 is an example of means for scanning a blockchain to detect whether a blockchain record includes a data fingerprint that matches the data fingerprint of a data item.

The example data leakage identification service 130 of FIG. 5 includes the fingerprint comparer 515 to compare the protected data fingerprint stored in the blockchain record scanned by the blockchain scanner 510 with the data fingerprint generated by the data fingerprinter 505 for the data item accessed from the data source(s) 140 of the associated data service. The fingerprint comparer 515 can perform any appropriate comparison technique to compare the protected data fingerprint with the data fingerprint of the accessed data item. For example, the fingerprint comparer 515 can perform one or more of a bitwise comparison, a correlation, a difference/subtraction operation, etc. If the fingerprint comparer 515 detects a match between the data fingerprint of the accessed data item and the protected data fingerprint included in the scanned blockchain record, the fingerprint comparer 515 determines the accessed data item is a leaked data item corresponding to the protected data item represented by the matching protected data fingerprint and, thus, invokes the blockchain writer 520 to report the leaked data item. The data fingerprint of an accessed data item determined to be a leaked data item is also referred to herein as a leaked data fingerprint.

The example data leakage identification service 130 of FIG. 5 includes the blockchain writer 520 to report the leaked data item by creating a timestamped blockchain record to store the leaked data fingerprint representing the leaked data item, and using the network interface 545 to write (e.g., send, transmit, upload, etc.) the timestamped blockchain record including the leaked data fingerprint representing the leaked data item to the blockchain server(s) 112 for addition to the blockchain 110. The blockchain record created by the blockchain writer 520 may have any appropriate data format, data structure, etc., capable of storing the leaked data fingerprint of the leaked data item and a timestamp generated by the time stamper 525. In some examples, the blockchain record created by the blockchain writer 520 also includes metadata generated by the metadata generator 530. As such, the blockchain writer 520 is an example of means for writing a blockchain record to a blockchain to indicate a data item accessed from a data source is associated with a leak of a protected item.

The example data leakage identification service 130 of FIG. 5 includes the time stamper 525 to generate a timestamp for inclusion in a blockchain record created by the blockchain writer 520. The time stamper 525 can be implemented by any clock, timing oscillator, timer, etc., and structured to output a time value according to any appropriate time format. In some examples, the blockchain writer 520 reads a timestamp from the time stamper 525 for inclusion in the blockchain record when the blockchain writer 520 creates the blockchain record such that the timestamp represents the time at which the blockchain record was created. In some examples, the blockchain writer 520 reads a timestamp from the time stamper 525 for inclusion in the blockchain record when the blockchain writer 520 is about to write the blockchain record to the blockchain 110 such that the timestamp represents the time at which the blockchain record was added to the blockchain 110. If the timestamped blockchain record corresponds to a leaked data item, the timestamp included in the timestamped blockchain record for the leaked data item will have a later time value than the timestamp included in the timestamped blockchain record for the corresponding protected data item. Thus, the later timestamp can be used to determine that the timestamped blockchain record for the leaked data item was added to the blockchain 110 after the timestamped blockchain record for the protected data item and, thus, represented a data leak of the protected data item.

The example data leakage identification service 130 of FIG. 5 includes the metadata generator 530 to generate metadata for inclusion in a blockchain record created by the blockchain writer 520. The metadata can be formatted in any data format or combinations of data format, such as binary data, alphanumeric data, etc. In some examples, the metadata generated by the metadata generator 530 includes flag, type value, etc., to identify a type of the blockchain record. For example, if the blockchain record is generated for a leaked data fingerprint associated with a leaked data item, the metadata generator 530 may generated metadata to indicate that a type of the blockchain record is a second type associated with leaked data items. Additionally or alternatively, in some examples, if the blockchain record is generated for a leaked data fingerprint associated with a leaked data item, the metadata generated by the metadata generator 530 includes a location, such as a URL, of the leaked data item to permit the leaked data item to be accessed from the data source(s) 140 and verified to be a data leak. In some examples, the metadata generated by the metadata generator 530 can include any other information in addition to, or as an alternative to, the aforementioned information.

In some examples, the data item accessed by the data fingerprinter 505 from the data source(s) 140 may be designated as a protected item. For example, a client of the data service associated with the data leakage identification service 130 may designate (specify) individual data items, classes of data items, directories of data items, folders of data items, etc., for data leakage protection. If the data item accessed by the data fingerprinter 505 from the data source(s) 140 is designated as a protected item, and the fingerprint comparer 515 does not detect a match between the data fingerprint of the accessed data item and the protected data fingerprints included in the blockchain records scanned by the blockchain scanner 510 (which ensures the designated protected data item is not actually an already leaked data item), the fingerprint comparer 515 writes the generated data fingerprint to the fingerprint database 535 as a protected data fingerprint representative of the protected data item. In such an example, the data fingerprinter 505 also invokes the blockchain writer 520 to create a blockchain record for the protected data fingerprint and to write the blockchain record to the blockchain 110.

For example, the blockchain writer 520 creates a timestamped blockchain record to store the protected data fingerprint generated by the data fingerprinter 205 for the designated protected data item. The blockchain record created by the blockchain writer 520 may have any appropriate data format, data structure, etc., capable of storing the protected data fingerprint and a timestamp generated by the time stamper 525. For example, as described above, the blockchain writer 520 may obtain a timestamp from the time stamper 525 identifying a time when the blockchain record was created, written to the blockchain 110, etc. In some examples, the blockchain record created by the blockchain writer 520 also includes metadata generated by the metadata generator 530. For example, the metadata generated by the metadata generator 530 may include ownership information associated with the protected data item represented by the protected data fingerprint to be included in the blockchain record. For example, the ownership information can include one or more of an identity and/or digital signature of the data owner, contact information for the data owner, such as an email address, a website URL, an anonymous contact service (e.g., utilizing an anonymous digital wallet), etc. Additionally or alternatively, the metadata generated by the metadata generator 530 may include type information (e.g., a flag, type value, etc.) to identify that a type of the blockchain record is a first type associated with protected data items. In some examples, the metadata generated by the metadata generator 530 can include any other information in addition to, or as an alternative to, the aforementioned information. In the illustrated example, the blockchain writer 520 uses the network interface 545 to write (e.g., send, transmit, upload, etc.) the timestamped blockchain record including the protected data fingerprint, timestamp and metadata (if present) to the blockchain server(s) 112 for addition to the blockchain 110.

The example data leakage identification service 130 of FIG. 5 includes the fingerprint database 535 to store the protected data fingerprints generated for the protected data items accessed from the protected data source(s) 140. The fingerprint database 535 can store the protected data fingerprints in any appropriate data format, data structure, etc. As such, the fingerprint database 535 can be implemented by any one or more memories, storage devices, servers, etc., or any combination thereof. In some examples, the fingerprint database 535 also maps (e.g., links) the protected data fingerprints stored therein to respective information identifying the protected data items corresponding respectively to the stored, protected data fingerprints. Such identifying information can include, for example, a filename, directory location, network location, URL, etc., of a particular protected data item in the data source(s) 140 of the data service associated with the data leakage identification service 130.

The example data leakage identification service 130 of FIG. 5 includes the leaked data notifier 540 to issue a data leakage notification when a leaked data item is detected by the fingerprint comparer 515. For example, if the leaked data item corresponds to a protected data item with a protected data fingerprint in the fingerprint database 535, the leaked data notifier 540 issues the data leakage notification to the affected data service client to indicate that the leaked data item is associated with that client's protected data item. In some such examples, the data leakage notification can be any type of communication, such as an email, a text, a social media post, a bulletin board post, etc., targeted to the data service client that own's protected item (e.g., based on information mapped to the protected data fingerprint in the fingerprint database 535). In some examples, if the leaked data item does not correspond to a protected data item with a protected data fingerprint in the fingerprint database 535 and, thus, is not associated with a data service client, the data leakage notification may be a general notification that the leaked data item has been detected, which the leaked data notifier 540 may post to a public forum, send to other data services implementing other data leakage identification services 130 to form a distributed data leakage detection collective, etc. For example, multiple data services may partner to share data leakage notifications amongst themselves to provide collective data leakage mitigation across the clients of the collection of data services. As such, the leaked data notifier 540 is an example of means for issuing a data leakage notification associated with a protected data item.

While example manners of implementing the example data leakage mitigation system 105 are illustrated in FIGS. 1-5, one or more of the elements, processes and/or devices illustrated in FIGS. 1-5 may be combined, divided, re-arranged, omitted, eliminated and/or implemented in any other way. Further, the example blockchain 110, the example blockchain servers 112, the example protected data identifier(s) 115, the example data leakage detector(s) 120, the example data leakage verifier(s) 125, the example data leakage identification service(s) 130, the example data source(s) 140, the example protected data source(s) 150, the example data leakage client system(s) 155, the example data leakage research system(s) 160, the example data fingerprinter 205, the example blockchain writer 210, the example time stamper 215, the example metadata generator 220, the example fingerprint database 225, the example network interface 230, the example data retriever 305, the example data fingerprinter 310, the example blockchain scanner 315, the example fingerprint comparer 320, the example blockchain writer 325, the example time stamper 330, the example metadata generator 335, the example network interface 340, the example blockchain monitor 405, the example fingerprint database 410, the example data retriever 415, the example data fingerprinter 420, the example fingerprint comparer 425, the example leaked data notifier 430, the example network interface 435, the example data fingerprinter 505, the example blockchain scanner 510, the example fingerprint comparer 515, the example blockchain writer 520, the example time stamper 525, the example metadata generator 530, the example fingerprint database 535, the example leaked data notifier 540, the example network interface 545 and/or, more generally, the example data leakage mitigation system 105 of FIGS. 1-5 may be implemented by hardware, software, firmware and/or any combination of hardware, software and/or firmware. Thus, for example, any of the example blockchain 110, the example blockchain servers 112, the example protected data identifier(s) 115, the example data leakage detector(s) 120, the example data leakage verifier(s) 125, the example data leakage identification service(s) 130, the example data source(s) 140, the example protected data source(s) 150, the example data leakage client system(s) 155, the example data leakage research system(s) 160, the example data fingerprinter 205, the example blockchain writer 210, the example time stamper 215, the example metadata generator 220, the example network interface 230, the example data retriever 305, the example data fingerprinter 310, the example blockchain scanner 315, the example fingerprint comparer 320, the example blockchain writer 325, the example time stamper 330, the example metadata generator 335, the example network interface 340, the example blockchain monitor 405, the example fingerprint database 410, the example data retriever 415, the example data fingerprinter 420, the example fingerprint comparer 425, the example leaked data notifier 430, the example network interface 435, the example data fingerprinter 505, the example blockchain scanner 510, the example fingerprint comparer 515, the example blockchain writer 520, the example time stamper 525, the example metadata generator 530, the example fingerprint database 535, the example leaked data notifier 540, the example network interface 545 and/or, more generally, the example data leakage mitigation system 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example data leakage mitigation system 105, the example blockchain 110, the example blockchain servers 112, the example protected data identifier(s) 115, the example data leakage detector(s) 120, the example data leakage verifier(s) 125, the example data leakage identification service(s) 130, the example data source(s) 140, the example protected data source(s) 150, the example data leakage client system(s) 155, the example data leakage research system(s) 160, the example data fingerprinter 205, the example blockchain writer 210, the example time stamper 215, the example metadata generator 220, the example fingerprint database 225, the example network interface 230, the example data retriever 305, the example data fingerprinter 310, the example blockchain scanner 315, the example fingerprint comparer 320, the example blockchain writer 325, the example time stamper 330, the example metadata generator 335, the example network interface 340, the example blockchain monitor 405, the example fingerprint database 410, the example data retriever 415, the example data fingerprinter 420, the example fingerprint comparer 425, the example leaked data notifier 430, the example network interface 435, the example data fingerprinter 505, the example blockchain scanner 510, the example fingerprint comparer 515, the example blockchain writer 520, the example time stamper 525, the example metadata generator 530, the example fingerprint database 535, the example leaked data notifier 540 and/or the example network interface 545 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data leakage mitigation system 105 of FIGS. 1-5 may include one or more elements, processes and/or devices in addition to, or instead of, those illustrated in FIGS. 1-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the data leakage mitigation system 105, the example blockchain 110, the example blockchain servers 112, the example protected data identifier(s) 115, the example data leakage detector(s) 120, the example data leakage verifier(s) 125, the example data leakage identification service(s) 130, the example data source(s) 140, the example protected data source(s) 150, the example data leakage client system(s) 155, the example data leakage research system(s) 160, the example data fingerprinter 205, the example blockchain writer 210, the example time stamper 215, the example metadata generator 220, the example fingerprint database 225, the example network interface 230, the example data retriever 305, the example data fingerprinter 310, the example blockchain scanner 315, the example fingerprint comparer 320, the example blockchain writer 325, the example time stamper 330, the example metadata generator 335, the example network interface 340, the example blockchain monitor 405, the example fingerprint database 410, the example data retriever 415, the example data fingerprinter 420, the example fingerprint comparer 425, the example leaked data notifier 430, the example network interface 435, the example data fingerprinter 505, the example blockchain scanner 510, the example fingerprint comparer 515, the example blockchain writer 520, the example time stamper 525, the example metadata generator 530, the example fingerprint database 535, the example leaked data notifier 540 and/or the example network interface 545 are shown in FIGS. 6-8 and 9A-B. In these examples, the machine readable instructions may be one or more executable programs or portion(s) of an executable program for execution by a computer processor, such as the processor 1012, 1112, 1212 and/or 1312 shown in the example processor platforms 1000, 1100, 1200 and 1300 discussed below in connection with FIGS. 10-13. In some examples, some or all of the processor platforms 1000, 1100, 1200 and 1300 may be implemented by the same processor platform (i.e., on one processor platform). The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 1012, 1112, 1212 and/or 1312, but the entire program or programs and/or parts thereof could alternatively be executed by a device other than the processors 1012, 1112, 1212 and/or 1312, and/or embodied in firmware or dedicated hardware. Further, although the example program(s) is(are) described with reference to the flowcharts illustrated in FIGS. 6-8 and 9A-B, many other methods of implementing the example data leakage mitigation system 105, the example blockchain 110, the example blockchain servers 112, the example protected data identifier(s) 115, the example data leakage detector(s) 120, the example data leakage verifier(s) 125, the example data leakage identification service(s) 130, the example data source(s) 140, the example protected data source(s) 150, the example data leakage client system(s) 155, the example data leakage research system(s) 160, the example data fingerprinter 205, the example blockchain writer 210, the example time stamper 215, the example metadata generator 220, the example fingerprint database 225, the example network interface 230, the example data retriever 305, the example data fingerprinter 310, the example blockchain scanner 315, the example fingerprint comparer 320, the example blockchain writer 325, the example time stamper 330, the example metadata generator 335, the example network interface 340, the example blockchain monitor 405, the example fingerprint database 410, the example data retriever 415, the example data fingerprinter 420, the example fingerprint comparer 425, the example leaked data notifier 430, the example network interface 435, the example data fingerprinter 505, the example blockchain scanner 510, the example fingerprint comparer 515, the example blockchain writer 520, the example time stamper 525, the example metadata generator 530, the example fingerprint database 535, the example leaked data notifier 540 and/or the example network interface 545 may alternatively be used. For example, with reference to the flowcharts illustrated in FIGS. 6-8 and 9A-B, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-8 and 9A-B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
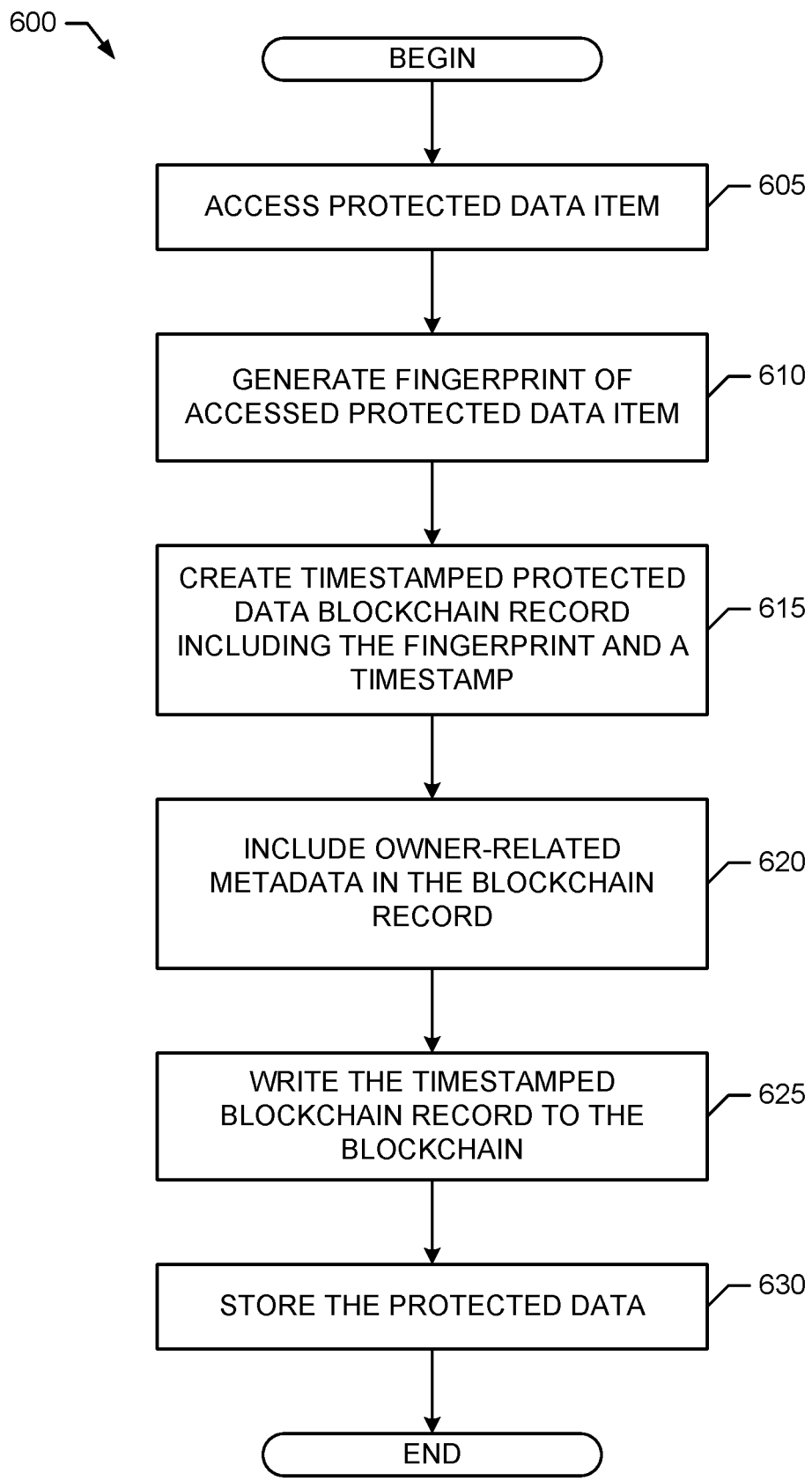
FIG. 6 is a flowchart representative of example computer readable instructions that may be executed to implement the example protected data identifier of FIG. 2.

An example program 600 that may be executed to implement the example protected data identifier 115 of FIGS. 1 and/or 2 is represented by the flowchart shown in FIG. 6. With reference to the preceding figures and associated written descriptions, the example program 600 begins execution at block 605 at which the data fingerprinter 205 of the protected data identifier 115 accesses a protected data item from the protected data source 150, as described above. At block 610, the data fingerprinter 205 generates a protected data fingerprint representative of the protected data item, as described above. At block 615, the blockchain writer 210 of the protected data identifier 115 creates a timestamped blockchain record included the protected data fingerprint and a timestamp obtained from the time stamper 215 of the protected data identifier 115, as described above. In some examples, at block 620, the blockchain writer 210 includes owner-related metadata and/or other metadata obtained from the metadata generator 220 of the protected data identifier 115 in the timestamped blockchain record, as described above. At block 625, the blockchain writer 210 writes the timestamped blockchain record to the blockchain 110, as described above. At block 968, the data fingerprinter 205 also stores the protected data fingerprint in the fingerprint database 225, as described above An example program 700 that may be executed to implement the example data leakage detector 120 of FIGS. 1 and/or 3 is represented by the flowchart shown in FIG. 7. With reference to the preceding figures and associated written descriptions, the example program 700 begins execution at block 705 at which the data retriever 305 of the data leakage detector 120 accesses a data item from the data source(s) 135, as described above. At block 710, the data fingerprinter 310 of the data leakage detector 120 generates a data fingerprint representative of the accessed data item, as described above. At block 715, the blockchain scanner 315 of the data leakage detector 120 scans the protected data blockchain records in the blockchain 110 and invokes the fingerprint comparer 320 of the data leakage detector 120 to compare the protected data fingerprints in the scanned blockchain records with the data fingerprint generated at block 710 for the accessed data item, as described above. If the fingerprint comparer 320 detects a match (block 720), then the accessed data item is considered to be a leaked data item and its data fingerprint is considered to be a leaked data fingerprint, as described above. Accordingly, at block 725, the blockchain writer 325 of the data leakage detector 120 creates a timestamped blockchain record including the leaked data fingerprint and a timestamp obtained from the time stamper 330 of the data leakage detector 120, as described above. In some examples, at block 730, the blockchain writer 325 includes metadata identifying a location of the leaked data item and/or other metadata obtained from the metadata generator 335 of the data leakage detector 120 in the timestamped blockchain record, as described above. At block 735, the blockchain writer 325 writes the timestamped blockchain record to the blockchain 110, as described above.

Figure 8:
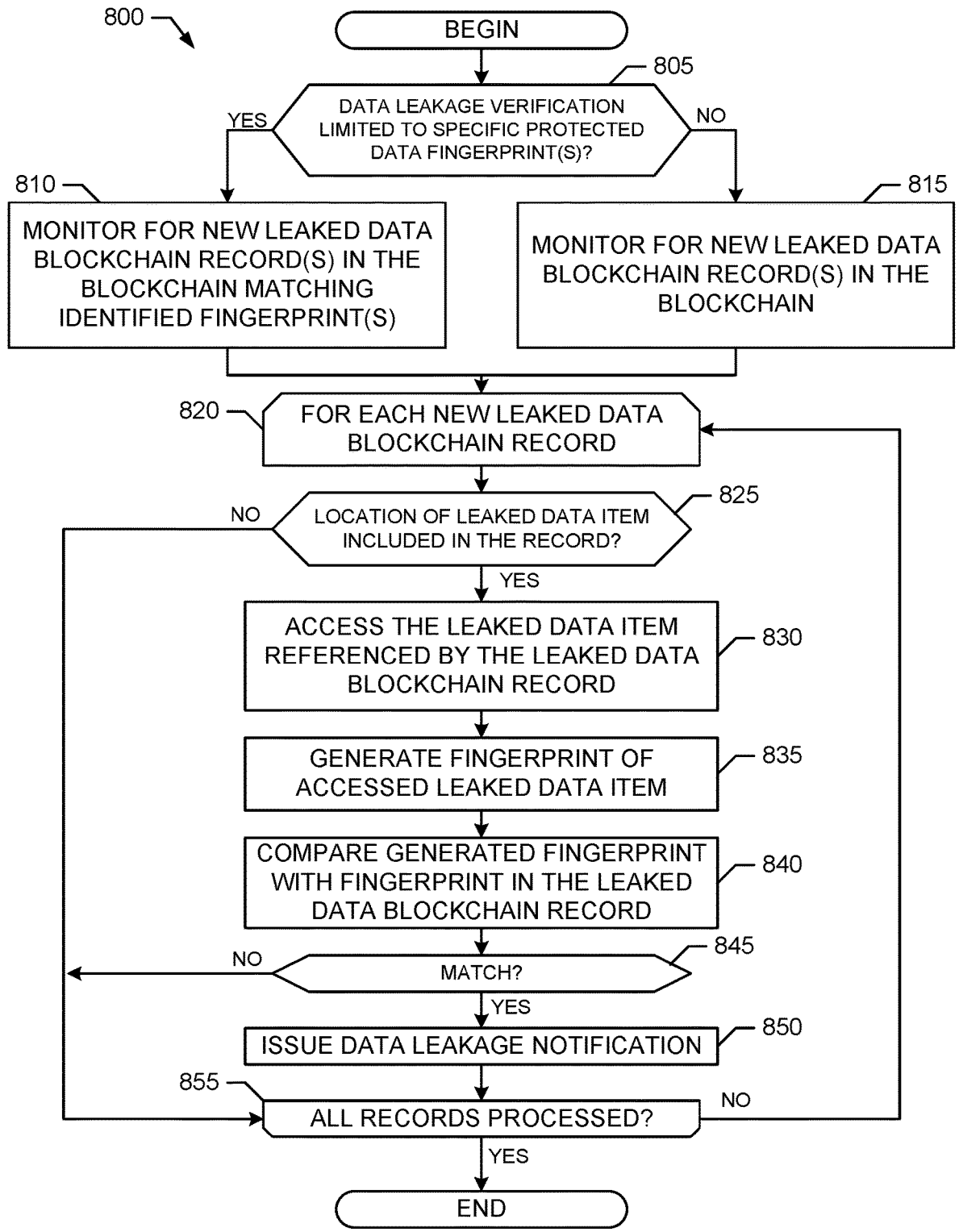
FIG. 8 is a flowchart representative of example computer readable instructions that may be executed to implement the example data leakage verifier of FIG. 4.

An example program 800 that may be executed to implement the example data leakage verifier 125 of FIGS. 1 and/or 4 is represented by the flowchart shown in FIG. 8. With reference to the preceding figures and associated written descriptions, the example program 800 begins execution at block 805 at which the blockchain monitor 405 of the data leakage verifier 125 determines whether blockchain monitoring for data leakage verification is to be limited to blockchain records having leaked data fingerprints matching one or more protected data fingerprints stored in the fingerprint database 410 of the data leakage verifier 125, as described above. If monitoring is limited to such protected data fingerprints (block 805), then at block 810 the blockchain monitor 405 limits monitoring of the blockchain 110 to monitoring for the addition to the blockchain 110 of new leaked data blockchain records that have leaked data fingerprints matching a protected data fingerprint stored in the fingerprint database 410, as described above. Otherwise, at block 815, the blockchain monitor 405 monitors for the addition of any new leaked data blockchain records to the blockchain 110.

At block 820, the data leakage verifier 125 begins validation of each new leaked data blockchain record detected by the blockchain monitor 405. For example, at block 825, the data retriever 415 of the data leakage verifier 125 determines if metadata identifying the location of the leaked data item is included in a next leaked data blockchain record detected by the blockchain monitor 405. If the blockchain record includes the location metadata (block 825), at block 830, the data retriever 415 uses the location metadata to retrieve the leaked data item from the data source(s) 135, as described above. At block 835, the data fingerprinter 420 of the data leakage verifier 125 generates a data fingerprint of the retrieved leaked data item, as described above. At block 840, the fingerprint comparer 425 compares the generated data fingerprint with the leaked data fingerprint stored in the blockchain record being validated, as described above. If the compared data fingerprints match (block 845), the leaked data notifier 430 of the data leakage verifier 125 issues a data leakage notification, as described above. At block 855, the data leakage verifier 125 continues validating other new leaked data blockchain record detected by the blockchain monitor 405.

Figure 9A:
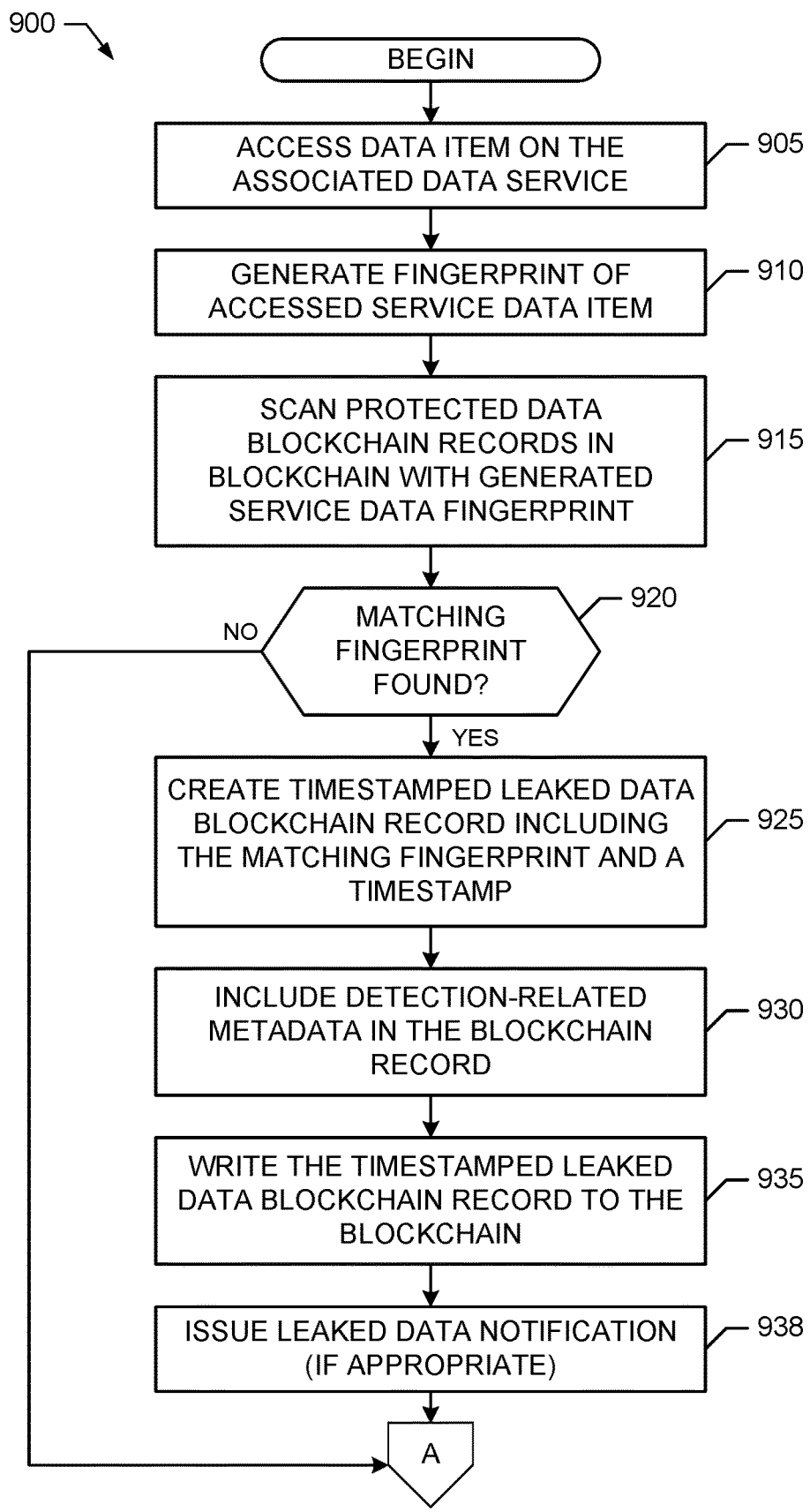
FIGS. 9A-B collectively illustrate a flowchart representative of example computer readable instructions that may be executed to implement the example data leakage identification service of FIG. 5.
Figure 9B:
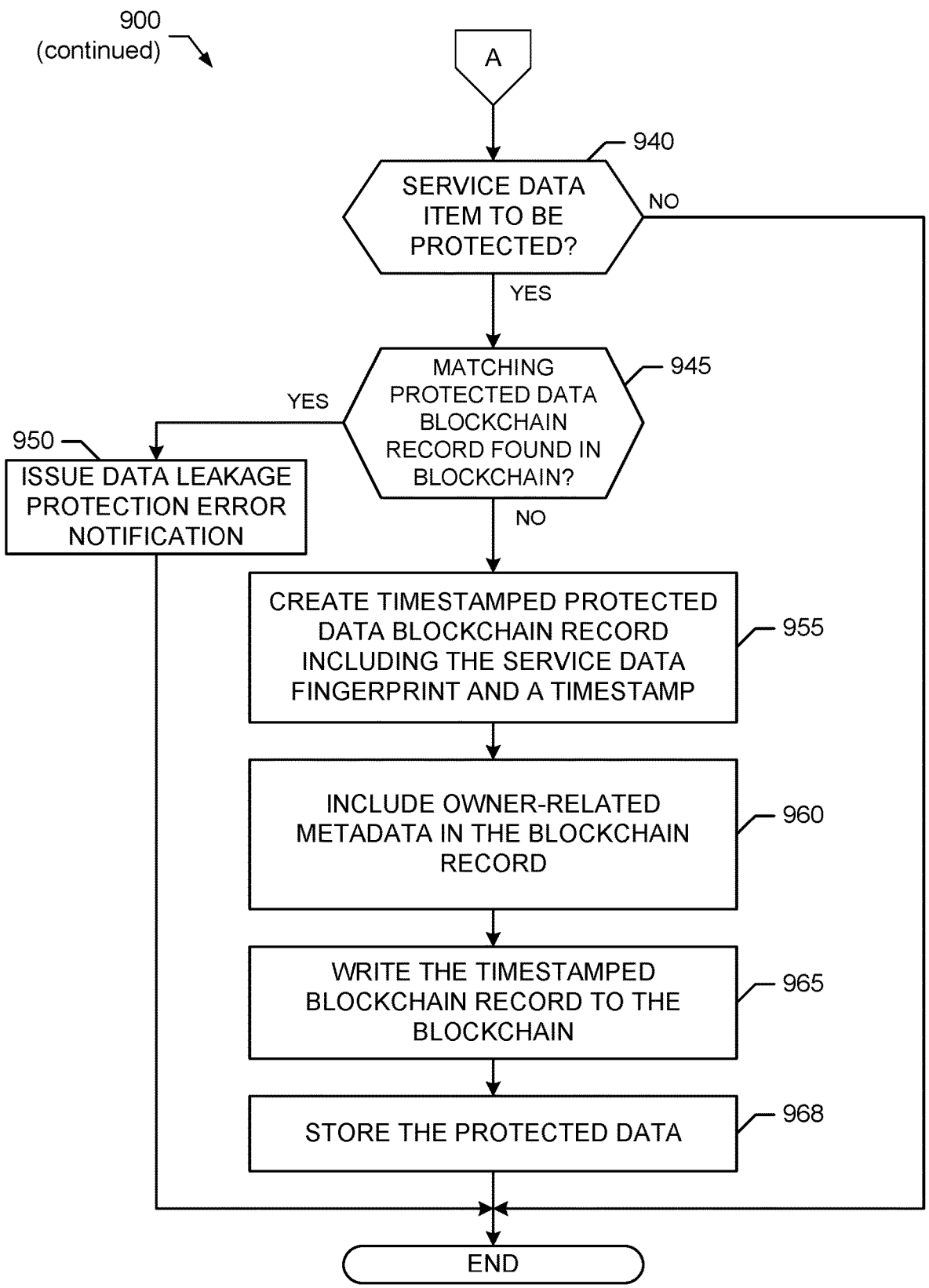

An example program 900 that may be executed to implement the example data leakage identification service 130 of FIGS. 1 and/or 5 is represented by the flowchart shown in FIGS. 9A-B. With reference to the preceding figures and associated written descriptions, the example program 900 begins execution at block 905 of FIG. 9A at which the data fingerprinter 505 of the data leakage identification service 130 accesses a data item from the data source(s) 140 of the data service associated with the data leakage identification service 130, as described. At block 910, the data fingerprinter 505 generates a data fingerprint of the accessed service data item, as described above. At block 915, the blockchain scanner 510 of the data leakage identification service 130 scans the protected data blockchain records of the blockchain 110 and invokes the fingerprint comparer 515 of the data leakage identification service 130 to compare the data fingerprint generated at block 910 for the accessed service data item with the protected data fingerprints included in the scanned blockchain records.

If the fingerprint comparer 515 detects a match (block 920), then the accessed data item is considered to be a leaked data item and its data fingerprint is considered to be a leaked data fingerprint, as described above. Accordingly, at block 925, the blockchain writer 520 of the data leakage identification service 130 creates a timestamped blockchain record including the leaked data fingerprint and a timestamp obtained from the time stamper 525 of the data leakage identification service 130, as described above. In some examples, at block 930, the blockchain writer 520 includes metadata identifying a location of the leaked data item and/or other metadata obtained from the metadata generator 530 of the data leakage identification service 130 in the timestamped blockchain record, as described above. At block 935, the blockchain writer 520 writes the timestamped blockchain record to the blockchain 110, as described above. At block 938, the leaked data notifier 540 of the data leakage identification service 130 issues a leaked data notification if the leaked data item corresponds to a protected data item with a protected data fingerprint in the fingerprint database 535 of the data leakage identification service 130, as described above.

At block 940 of FIG. 9B, the fingerprint comparer 515 determines, as described above, whether the data item accessed at block 905 is also designated to be a protected data item. If the accessed data item is a designated protected data item (block 905), then at block 945, the fingerprint comparer 515 determines whether a protected data blockchain record with a matching protected data fingerprint was found during the processing at blocks 915-920. If a blockchain record with a matching protected data fingerprint was found (block 945), then the designated protected data item actually corresponds to a leaked data item, and at block 950, the fingerprint comparer 515 issues a data leakage protection error to indicate that the designated protected data item is unable to be protected because it corresponds to a leaked data item. For example, the data leakage protection error may be an error message sent to the data service implementing the data leakage identification service 130, an error message sent to the data service client that designated the data item to be a protected data item, etc. Otherwise, the accessed data item is considered to be a protected data item and its data fingerprint is considered to be a protected data fingerprint and, thus, at block 955, the blockchain writer 520 creates a timestamped blockchain record including the protected data fingerprint and a timestamp obtained from the time stamper 525, as described above. In some examples, at block 960, the blockchain writer 520 includes owner-related metadata and/or other metadata obtained from the metadata generator 530 in the timestamped blockchain record, as described above. At block 965, the blockchain writer 520 writes the timestamped blockchain record to the blockchain 110, as described above. At block 968, the fingerprint comparer 515 also stores the protected data fingerprint in the fingerprint database 535, as described above.

Figure 10:
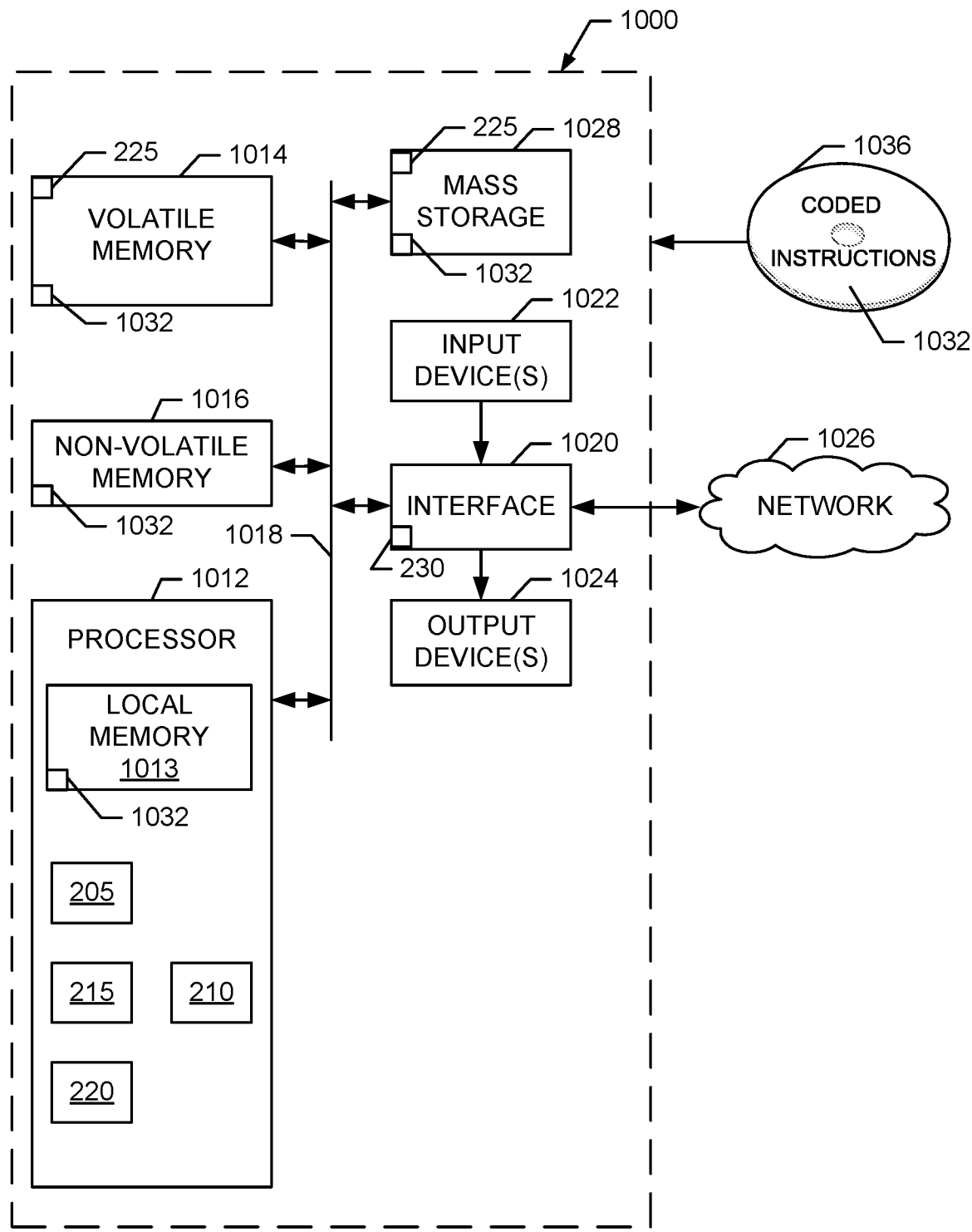
FIG. 10 is a block diagram of an example processor platform structured to execute the example computer readable instructions of FIG. 6 to implement the example protected data identifier of FIG. 2.

FIG. 10 is a block diagram of an example processor platform 1000 structured to execute the instructions of FIG. 6 to implement the example protected data identifier 115 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad') or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the data fingerprinter 205, the example blockchain writer 210, the example time stamper 215, and the example metadata generator 220.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026, such as the network 145. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1020 implements the example network interface 230.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In some examples, the mass storage device 1028 may implement the example fingerprint database 225. Additionally or alternatively, in some examples the volatile memory 1014 may implement the example fingerprint database 225.

The machine executable instructions 1032 corresponding to the instructions of FIG. 6 may be stored in the mass storage device 1028, in the volatile memory 1014, in the non-volatile memory 1016, in the local memory 1013 and/or on a removable non-transitory computer readable storage medium, such as a CD or DVD 1036.

Figure 7:
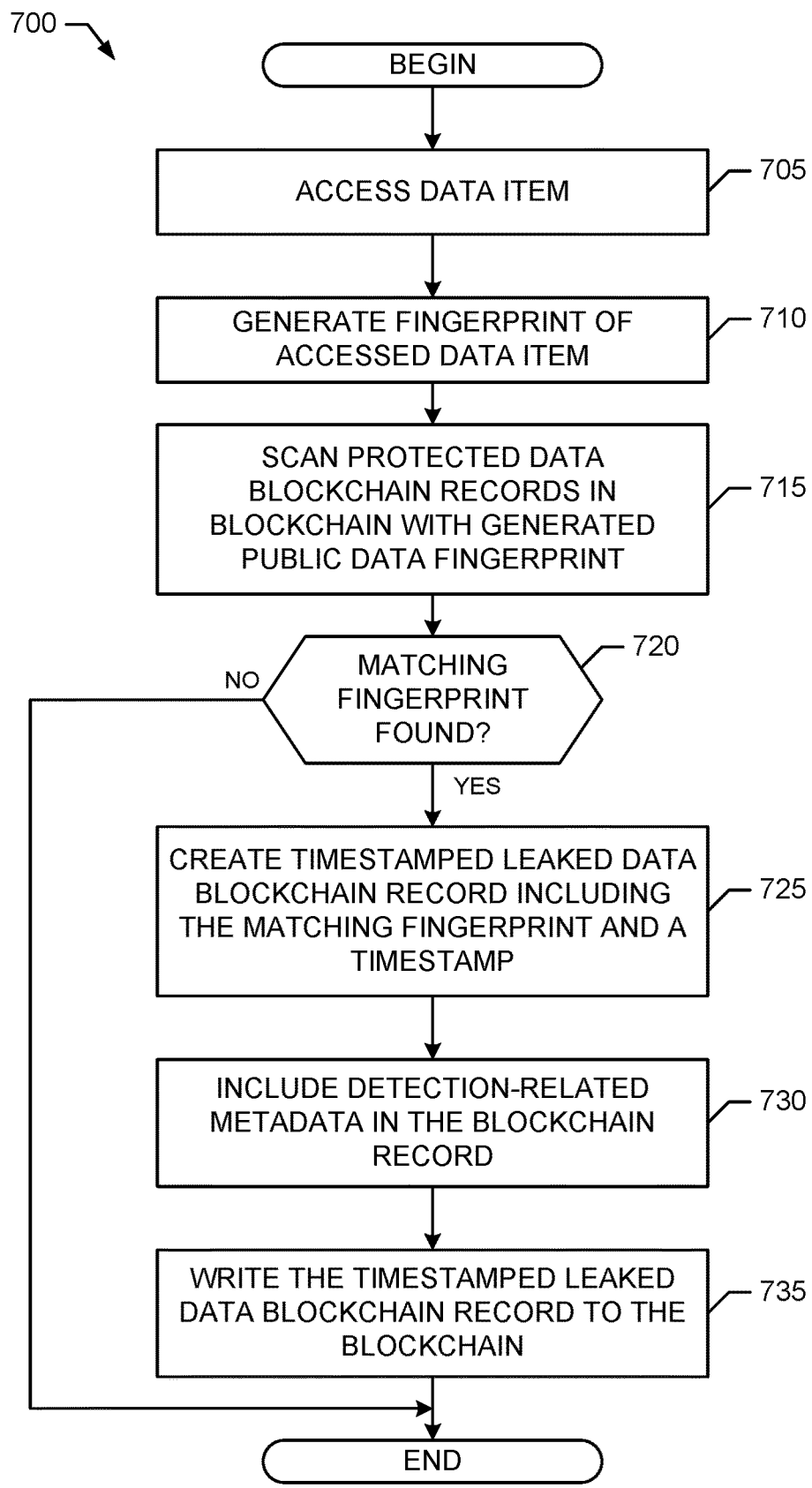
FIG. 7 is a flowchart representative of example computer readable instructions that may be executed to implement the example data leakage detector of FIG. 3.
Figure 11:
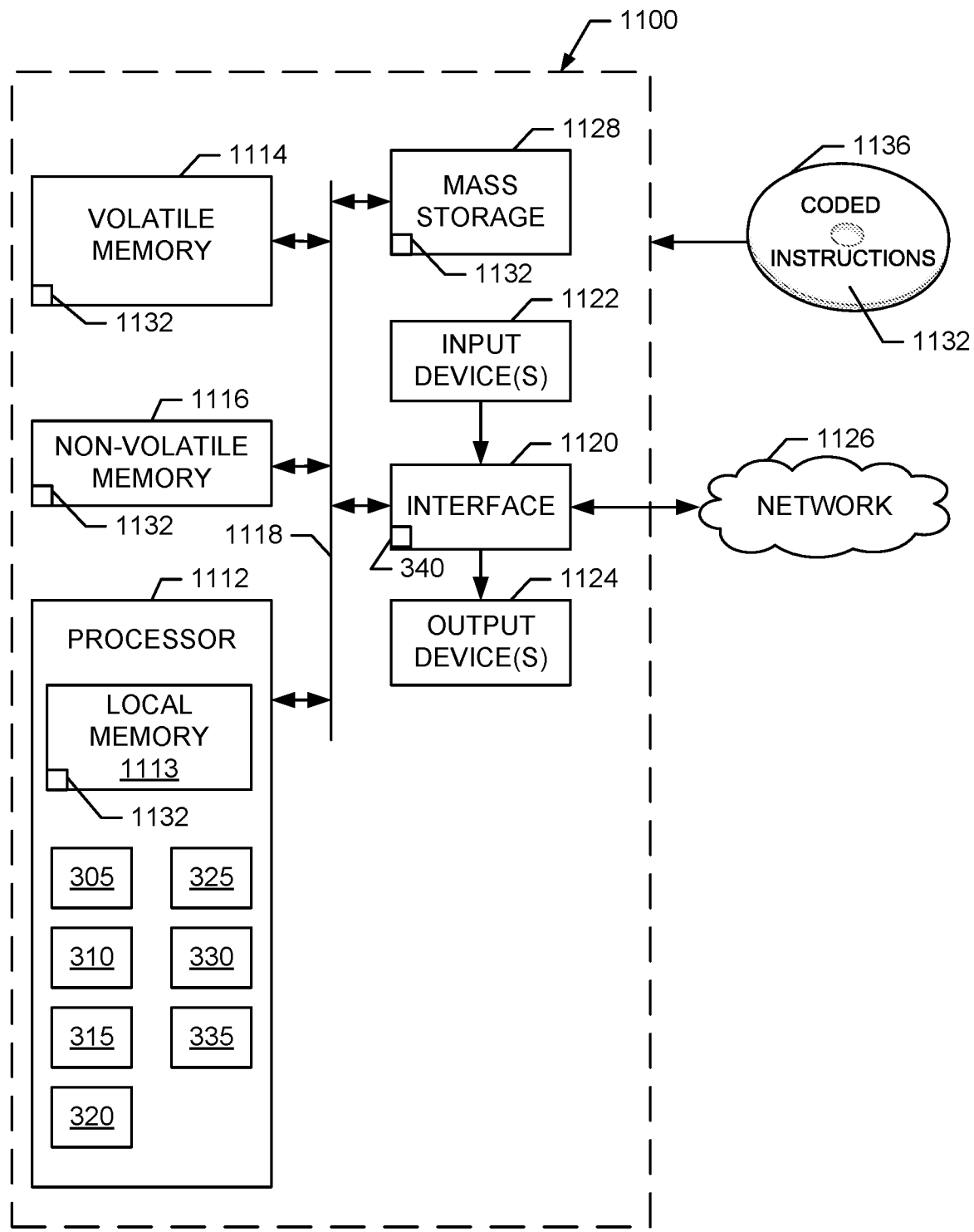
FIG. 11 is a block diagram of an example processor platform structured to execute the example computer readable instructions of FIG. 7 to implement the example data leakage detector of FIG. 3.

FIG. 11 is a block diagram of an example processor platform 1100 structured to execute the instructions of FIG. 7 to implement the example data leakage detector 120 of FIGS. 1 and/or 3. The processor platform 1100 can be, for example, a server, a personal computer, a workstation, a self-learning machine (e.g., a neural network), a mobile device (e.g., a cell phone, a smart phone, a tablet such as an iPad™) or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor 1112 may be a semiconductor based (e.g., silicon based) device. In this example, the processor 1112 implements the example data retriever 305, the example data fingerprinter 310, the example blockchain scanner 315, the example fingerprint comparer 320, the example blockchain writer 325, the example time stamper 330, and the example metadata generator 335.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM® and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, a Bluetooth® interface, an NFC interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED, an OLED, an LCD, a CRT display, an IPS display, a touchscreen, etc.), a tactile output device, a printer and/or speakers(s). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126, such as the network 145. The communication can be via, for example, an Ethernet connection, a DSL connection, a telephone line connection, a coaxial cable system, a satellite system, a line-of-site wireless system, a cellular telephone system, etc. In this example, the interface circuit 1120 implements the example network interface 340.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

The machine executable instructions 1132 corresponding to the instructions of FIG. 7 may be stored in the mass storage device 1128, in the volatile memory 1114, in the non-volatile memory 1116, in the local memory 1113 and/or on a removable non-transitory computer readable storage medium, such as a CD or DVD 1136.

Figure 12:
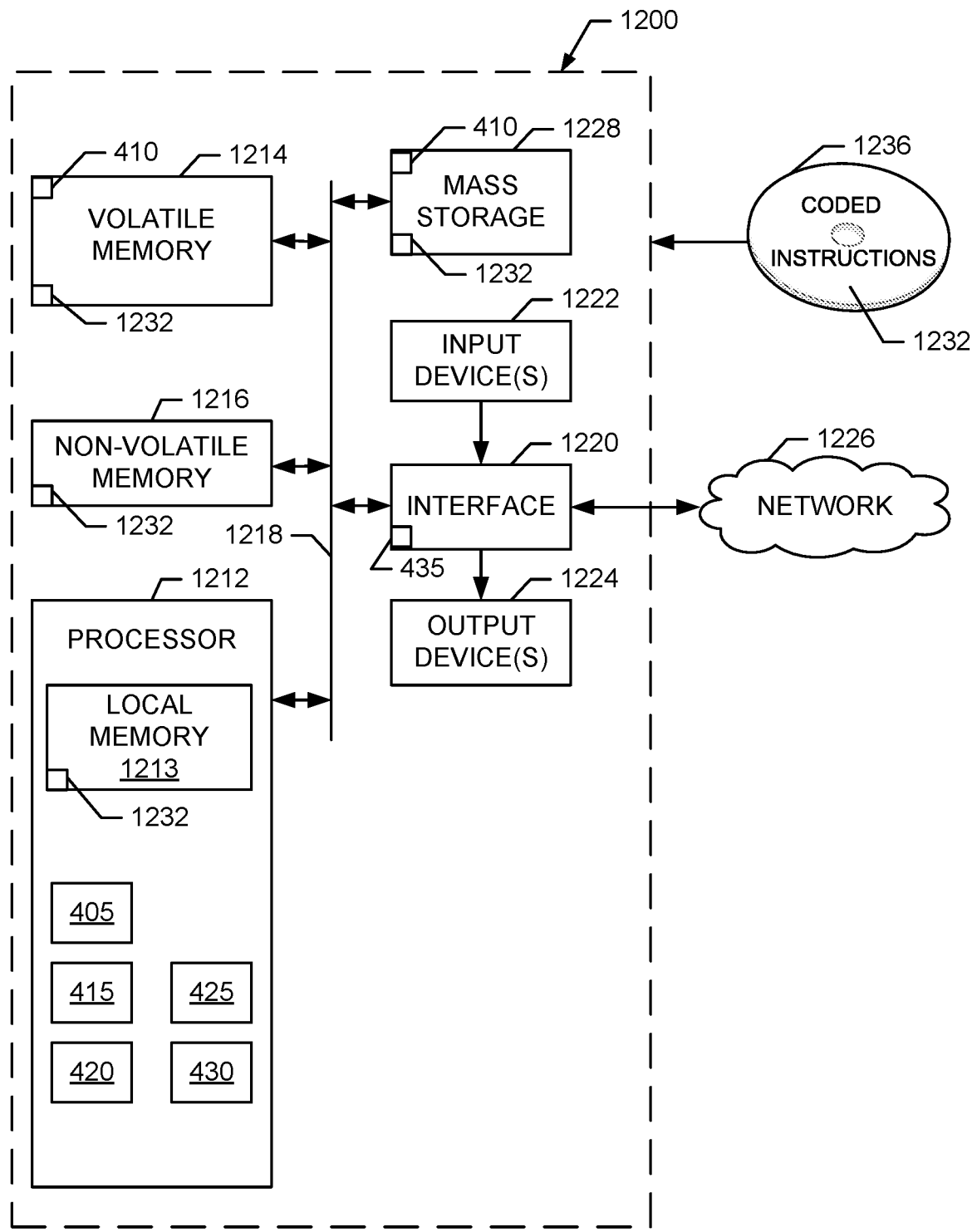
FIG. 12 is a block diagram of an example processor platform structured to execute the example computer readable instructions of FIG. 8 to implement the example data leakage verifier of FIG. 4.

FIG. 12 is a block diagram of an example processor platform 1200 structured to execute the instructions of FIG. 8 to implement the example data leakage verifier 125 of FIGS. 1 and/or 4. The processor platform 1200 can be, for example, a server, a personal computer, a workstation, a self-learning machine (e.g., a neural network), a mobile device (e.g., a cell phone, a smart phone, a tablet such as an iPad') or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor 1212 may be a semiconductor based (e.g., silicon based) device. In this example, the processor 1212 implements the example blockchain monitor 405, the example data retriever 415, the example data fingerprinter 420, the example fingerprint comparer 425, and the example leaked data notifier 430.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM® and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, a Bluetooth® interface, an NFC interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, an LCD, a CRT display, an IPS display, a touchscreen, etc.), a tactile output device, a printer and/or speakers(s). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226, such as the network 145. The communication can be via, for example, an Ethernet connection, a DSL connection, a telephone line connection, a coaxial cable system, a satellite system, a line-of-site wireless system, a cellular telephone system, etc. In this example, the interface circuit 1220 implements the example network interface 435.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives. In some examples, the mass storage device 1228 may implement the example fingerprint database 410. Additionally or alternatively, in some examples the volatile memory 1214 may implement the example fingerprint database 410.

The machine executable instructions 1232 corresponding to the instructions of FIG. 8 may be stored in the mass storage device 1228, in the volatile memory 1214, in the non-volatile memory 1216, in the local memory 1213 and/or on a removable non-transitory computer readable storage medium, such as a CD or DVD 1236.

Figure 13:
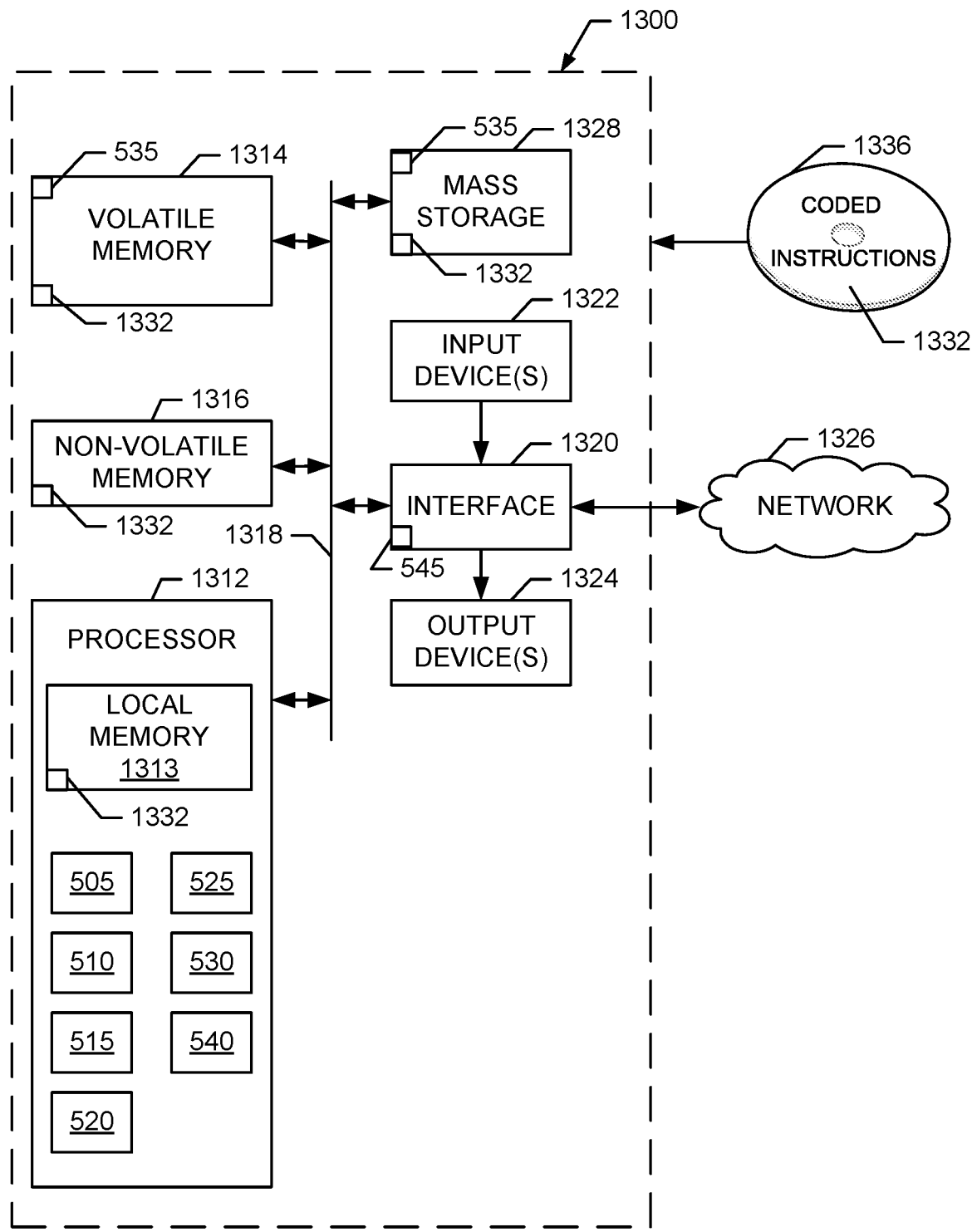
FIG. 13 is a block diagram of an example processor platform structured to execute the example computer readable instructions of FIG. 9 to implement the example data leakage identification service of FIG. 5.

FIG. 13 is a block diagram of an example processor platform 1300 structured to execute the instructions of FIG. 10 to implement the example data leakage identification service 130 of FIGS. 1 and/or 5. The processor platform 1300 can be, for example, a server, a personal computer, a workstation, a self-learning machine (e.g., a neural network), a mobile device (e.g., a cell phone, a smart phone, a tablet such as an iPad'), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor 1312 may be a semiconductor based (e.g., silicon based) device. In this example, the processor 1312 implements the example data fingerprinter 505, the example blockchain scanner 510, the example fingerprint comparer 515, the example blockchain writer 520, the example time stamper 525, the example metadata generator 530, and the example leaked data notifier 540.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by SDRAM, DRAM, RDRAM® and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a USB, a Bluetooth® interface, an NFC interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., an LED, an OLED, an LCD, a CRT display, an IPS display, a touchscreen, etc.), a tactile output device, a printer and/or speakers(s). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326, such as the network 145. The communication can be via, for example, an Ethernet connection, a DSL connection, a telephone line connection, a coaxial cable system, a satellite system, a line-of-site wireless system, a cellular telephone system, etc. In this example, the interface circuit 1220 implements the example network interface 545.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives. In some examples, the mass storage device 1228 may implement the example fingerprint database 535. Additionally or alternatively, in some examples the volatile memory 1214 may implement the example fingerprint database 535.

The machine executable instructions 1332 corresponding to the instructions of FIGS. 9A-9B may be stored in the mass storage device 1328, in the volatile memory 1314, in the non-volatile memory 1316, in the local memory 1313 and/or on a removable non-transitory computer readable storage medium, such as a CD or DVD 1336.

From the foregoing, it will be appreciated that example methods, apparatus and articles of manufacture have been disclosed that perform data leakage mitigation with a blockchain. Disclosed methods, apparatus and articles of manufacture improve the efficiency of using a computing device by leveraging a blockchain, which can be used by a third party, even an untrusted third party, to detect unauthorized release of a protected data item outside a trusted domain of a data owner without the need to share the actual protected data item with the third party. Thus, disclosed example data leakage mitigation solutions can increase the number of third parties involved in data leakage detection, thereby increasing the likelihood of detecting the leaked data item and reducing the amount of the time the leaked data item is publicly available before mitigating action can be taken.

Disclosed methods, apparatus and articles of manufacture are accordingly directed to one or more improvement(s) in the functioning of a computer.

The foregoing disclosure provides example solutions to perform data leakage mitigation with a blockchain. The following further examples, which include subject matter such as a data leakage detection apparatus, at least one non-transitory computer readable medium including instructions that, when executed, cause at least one processor to perform data leakage detection, and a data leakage detection method, are disclosed herein. The disclosed examples can be implemented individually and/or in one or more combinations.

Example 1 is a data leakage detection apparatus including a fingerprinter to generate a first data fingerprint of a first data item accessed from a data source. The apparatus of example 1 also includes a blockchain scanner to scan a blockchain to detect whether a first blockchain record includes a second data fingerprint that matches the first data fingerprint of the first data item. The apparatus of example 1 further includes a blockchain writer to write a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp.

Example 2 includes the subject matter of example 1, wherein the blockchain writer is to include metadata in the second blockchain record, the metadata to identify a location of the first data item.

Example 3 includes the subject matter of example 2, wherein the metadata includes a uniform resource locator of the first data item.

Example 4 includes the subject matter of example 2 or example 3, wherein the metadata is first metadata, and the blockchain writer is to include second metadata in the second blockchain record, the second metadata to identify a type of the second blockchain record.

Example 5 includes the subject matter of any one of examples 1 to 4, wherein the blockchain is to include blockchain records of a first type associated with protected data items and blockchain records of a second type associated with leaked data items, and the blockchain scanner is to limit comparison of the first data fingerprint of the first data item to respective data fingerprints included in the blockchain records of the first type.

Example 6 includes the subject matter of example 5, wherein the first data item is designated for data leakage protection, and when the first data fingerprint of the first data item does not match any of the data fingerprints included in the blockchain records of the first type, the blockchain writer is to write a third blockchain record to the blockchain to indicate the first data item is a second protected data item, the third blockchain record to include the first data fingerprint and the first timestamp.

Example 7 includes the subject matter of example 6, wherein the blockchain writer is to include metadata in the third blockchain record, the metadata including ownership information associated with the first data item.

Example 8 includes the subject matter of any one of examples 1 to 7, and further includes a notifier to issue a data leakage notification associated with the protected data item when the second data fingerprint matches the first data fingerprint.

Example 9 is a non-transitory computer readable medium including computer readable instructions which, when executed, cause at least one processor to at least: (i) generate a first data fingerprint of a first data item accessed from a data source; (ii) scan a blockchain to detect whether a first blockchain record includes a second data fingerprint that matches the first data fingerprint of the first data item; and (iii) write a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp.

Example 10 includes the subject matter of example 9, wherein the instructions, when executed, cause the at least one processor to include metadata in the second blockchain record, the metadata to identify a location of the first data item.

Example 11 includes the subject matter of example 10, wherein the metadata includes a uniform resource locator of the first data item.

Example 12 includes the subject matter of example 10 or example 11, wherein the metadata is first metadata, and the instructions, when executed, cause the at least one processor to include second metadata in the second blockchain record, the second metadata to identify a type of the second blockchain record.

Example 13 includes the subject matter of any one of examples 9 to 12, wherein the blockchain is to include blockchain records of a first type associated with protected data items and blockchain records of a second type associated with data leak detections, and the instructions, when executed, cause the at least one processor to limit comparison of the first data fingerprint of the first data item to respective data fingerprints included the blockchain records of the first type.

Example 14 includes the subject matter of example 13, wherein the first data item is designated for data leakage protection, and when the first data fingerprint of the first data item does not match any of the data fingerprints included in the blockchain records of the first type, the instructions, when executed, cause the at least one processor to write a third blockchain record to the blockchain to indicate the first data item is a second protected data item, the third blockchain record to include the first data fingerprint and the first timestamp.

Example 15 includes the subject matter of example 14, wherein the instructions, when executed, cause the at least one processor to include metadata in the third blockchain record, the metadata including ownership information associated with the first data item.

Example 16 includes the subject matter of any one of examples 9 to 15, wherein the instructions, when executed, cause the at least one processor to issue a data leakage notification associated with the protected data item when the second data fingerprint matches the first data fingerprint.

Example 17 is a data leakage detection method including generating, by executing an instruction with at least one processor, a first data fingerprint of a first data item accessed from a data source. The method of example 17 also includes scanning, by executing an instruction with the at least one processor, a blockchain to detect whether a first blockchain record includes a second data fingerprint that matches the first data fingerprint of the first data item. The method of example 17 further includes writing, by executing an instruction with the at least one processor, a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp.

Example 18 includes the subject matter of example 17, wherein the second blockchain record includes metadata to identify a location of the first data item.

Example 19 includes the subject matter of example 18, wherein the metadata includes a uniform resource locator of the first data item.

Example 20 includes the subject matter of example 18 or example 19, wherein the metadata is first metadata, and the second blockchain record include second metadata to identify a type of the second blockchain record.

Example 21 includes the subject matter of any one of examples 17 to 20, wherein the blockchain is to include blockchain records of a first type associated with protected data items and blockchain records of a second type associated with data leak detections, and wherein the scanning is to limit comparison of the first data fingerprint of the first data item to respective data fingerprints included the blockchain records of the first type.

Example 22 includes the subject matter of example 21, wherein the first data item is designated for data leakage protection, and further including, when the first data fingerprint of the first data item does not match any of the data fingerprints included in the blockchain records of the first type, writing a third blockchain record to the blockchain to indicate the first data item is a second protected data item, the third blockchain record to include the first data fingerprint and the first timestamp.

Example 23 includes the subject matter of example 22, wherein the third blockchain record includes metadata, the metadata including ownership information associated with the first data item.

Example 24 includes the subject matter of any one of examples 17 to 23, and further includes issuing a data leakage notification associated with the protected data item when the second data fingerprint matches the first data fingerprint.

Example 25 is a data leakage apparatus including means for generating a first data fingerprint of a first data item accessed from a data source. The apparatus of example 25 also includes means for scanning a blockchain to detect whether a first blockchain record includes a second data fingerprint that matches the first data fingerprint of the first data item. The apparatus of example 25 further includes means for writing a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp.

Example 26 includes the subject matter of example 25, wherein the means for writing is to include metadata in the second blockchain record, the metadata to identify a location of the first data item.

Example 27 includes the subject matter of example 26, wherein the metadata includes a uniform resource locator of the first data item.

Example 28 includes the subject matter of example 26 or example 27, wherein the metadata is first metadata, and the means for writing is to include second metadata in the second blockchain record, the second metadata to identify a type of the second blockchain record.

Example 29 includes the subject matter of any one of examples 25 to 28, wherein the blockchain is to include blockchain records of a first type associated with protected data items and blockchain records of a second type associated with leaked data items, and the means for scanning is to limit comparison of the first data fingerprint of the first data item to respective data fingerprints included in the blockchain records of the first type.

Example 30 includes the subject matter of example 29, wherein the first data item is designated for data leakage protection, and when the first data fingerprint of the first data item does not match any of the data fingerprints included in the blockchain records of the first type, the means for writing is to write a third blockchain record to the blockchain to indicate the first data item is a second protected data item, the third blockchain record to include the first data fingerprint and the first timestamp.

Example 31 includes the subject matter of example 30, wherein the means for writing is to include metadata in the third blockchain record, the metadata including ownership information associated with the first data item.

Example 32 includes the subject matter of any one of examples 25 to 31, and further includes means for issuing a data leakage notification associated with the protected data item when the second data fingerprint matches the first data fingerprint.

Example 33 is a data leakage verification apparatus including a blockchain monitor to monitor a blockchain to detect a blockchain record associated with a data leak of a protected data item, the blockchain record including a first data fingerprint of a leaked data item corresponding to the protected data item, a timestamp, and location metadata to identify a location of the leaked data item. The apparatus of example 33 also includes a data retriever to access the leaked data item from a data source based on the location metadata. The apparatus of example 33 further includes a fingerprinter to generate a second data fingerprint of the leaked data item. The apparatus of example 33 also includes a notifier to issue a data leakage notification associated with the protected data item when the second data fingerprint matches the first data fingerprint.

Example 34 includes the subject matter of example 33, wherein the blockchain record is a first blockchain record, and the blockchain monitor is to monitor the blockchain for inclusion of blockchain records having respective data fingerprints that match a third data fingerprint associated with the protected data item, the first data fingerprint of the first blockchain record to match the third data fingerprint associated with the protected data item.

Example 35 includes the subject matter of example 33 or example 34, wherein the location metadata includes a uniform resource locator of the leaked data item.

Example 36 includes the subject matter of any one of examples 33 to 35, wherein the blockchain is to include blockchain records of a first type associated with protected data items and blockchain records of a second type associated with data leak detections, and the blockchain monitor is to limit monitoring of the blockchain to inclusion of the blockchain records of the second type.

Example 37 is a non-transitory computer readable medium including computer readable instructions which, when executed, cause at least one processor to at least: (i) monitor a blockchain to detect a blockchain record associated with a data leak of a protected data item, the blockchain record including a first data fingerprint of a leaked data item corresponding to the protected data item, a timestamp, and location metadata to identify a location of the leaked data item; (ii) access the leaked data item from a data source based on the location metadata; (iii) generate a second data fingerprint of the leaked data item; and (iv) issue a data leakage notification associated with the protected data item when the second data fingerprint matches the first data fingerprint.

Example 38 includes the subject matter of example 37, wherein the blockchain record is a first blockchain record, and the instructions, when executed, cause the at least one processor to monitor the blockchain for inclusion of blockchain records having respective data fingerprints that match a third data fingerprint associated with the protected data item, the first data fingerprint of the first blockchain record to match the third data fingerprint associated with the protected data item.

Example 39 includes the subject matter of example 37 or example 38, wherein the location metadata includes a uniform resource locator of the leaked data item.

Example 40 includes the subject matter of any one of examples 37 to 39, wherein the blockchain is to include blockchain records of a first type associated with protected data items and blockchain records of a second type associated with data leak detections, and the instructions, when executed, cause the at least one processor to limit monitoring of the blockchain to inclusion of the blockchain records of the second type.

Example 41 is a data leakage verification method including monitoring, by executing an instruction with at least one processor, a blockchain to detect a blockchain record associated with a data leak of a protected data item, the blockchain record including a first data fingerprint of a leaked data item corresponding to the protected data item, a timestamp, and location metadata to identify a location of the leaked data item. The method of example 41 also includes accessing, by executing an instruction with the at least one processor, the leaked data item from a data source based on the location metadata. The method of example 41 further includes generating, by executing an instruction with the at least one processor, a second data fingerprint of the leaked data item. The method of example 41 also includes issuing, by executing an instruction with the at least one processor, a data leakage notification associated with the protected data item when the second data fingerprint matches the first data fingerprint.

Example 42 includes the subject matter of example 41, wherein the blockchain record is a first blockchain record, and further including monitoring the blockchain for inclusion of blockchain records having respective data fingerprints that match a third data fingerprint associated with the protected data item, the first data fingerprint of the first blockchain record to match the third data fingerprint associated with the protected data item.

Example 43 includes the subject matter of example 41 or example 42, wherein the location metadata includes a uniform resource locator of the leaked data item.

Example 44 includes the subject matter of any one of examples 41 to 43, wherein the blockchain is to include blockchain records of a first type associated with protected data items and blockchain records of a second type associated with data leak detections, and the monitoring is limited to monitoring of the blockchain to inclusion of the blockchain records of the second type.

Example 45 is a data leakage verification apparatus including means for monitoring a blockchain to detect a blockchain record associated with a data leak of a protected data item, the blockchain record including a first data fingerprint of a leaked data item corresponding to the protected data item, a timestamp, and location metadata to identify a location of the leaked data item. The apparatus of example 45 also includes means for accessing the leaked data item from a data source based on the location metadata. The apparatus of example 45 further includes means for generating a second data fingerprint of the leaked data item. The apparatus of example 45 also includes means for issuing a data leakage notification associated with the protected data item when the second data fingerprint matches the first data fingerprint.

Example 46 includes the subject matter of example 45, wherein the blockchain record is a first blockchain record, and the means for monitoring is to monitor the blockchain for inclusion of blockchain records having respective data fingerprints that match a third data fingerprint associated with the protected data item, the first data fingerprint of the first blockchain record to match the third data fingerprint associated with the protected data item.

Example 47 includes the subject matter of example 45 or example 46, wherein the location metadata includes a uniform resource locator of the leaked data item.

Example 48 includes the subject matter of any one of examples 45 to 47, wherein the blockchain is to include blockchain records of a first type associated with protected data items and blockchain records of a second type associated with data leak detections, and the means for monitoring is to limit monitoring of the blockchain to inclusion of the blockchain records of the second type.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A data leakage detection apparatus comprising:
   at least one memory;
   instructions in the apparatus; and
   processor circuitry to execute the instructions to at least:
      generate a first data fingerprint of a first data item accessed from a data source;
      scan a blockchain to detect whether a first blockchain record includes a second data fingerprint that matches the first data fingerprint of the first data item, the blockchain different from the data source;
      write a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp; and
      issue a data leakage notification associated with the protected data item when the second data fingerprint matches the first data fingerprint.

2. The apparatus of claim 1, wherein the processor circuitry is to include metadata in the second blockchain record, the metadata to identify a location of the first data item.

3. The apparatus of claim 2, wherein the metadata is first metadata, and the processor circuitry is to include second metadata in the second blockchain record, the second metadata to identify a type of the second blockchain record.

4. The apparatus of claim 1, wherein the blockchain is to include blockchain records of a first type associated with protected data items and blockchain records of a second type associated with leaked data items, and the processor circuitry is to limit comparison of the first data fingerprint of the first data item to respective data fingerprints included in the blockchain records of the first type.

5. The apparatus of claim 4, wherein the first data item is designated for data leakage protection, and when the first data fingerprint of the first data item does not match any of the data fingerprints included in the blockchain records of the first type, the processor circuitry is to write a third blockchain record to the blockchain to indicate the first data item is a second protected data item, the third blockchain record to include the first data fingerprint and the first timestamp.

6. A non-transitory computer readable medium comprising computer readable instructions which, when executed, cause at least one processor to at least:
generate a first data fingerprint of a first data item accessed from a data source;
scan a blockchain to detect whether a first blockchain record includes a second data fingerprint that matches the first data fingerprint of the first data item, the blockchain different from the data source;
write a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp; and
issue a data leakage notification associated with the protected data item when the second data fingerprint matches the first data fingerprint.

7. The non-transitory computer readable medium of claim 6, wherein the instructions, when executed, cause the at least one processor to include metadata in the second blockchain record, the metadata to identify a location of the first data item.

8. The non-transitory computer readable medium of claim 7, wherein the metadata includes a uniform resource locator of the first data item.

9. The non-transitory computer readable medium of claim 7, wherein the metadata is first metadata, and the instructions, when executed, cause the at least one processor to include second metadata in the second blockchain record, the second metadata to identify a type of the second blockchain record.

10. The non-transitory computer readable medium of claim 6, wherein the blockchain is to include blockchain records of a first type associated with protected data items and blockchain records of a second type associated with data leak detections, and the instructions, when executed, cause the at least one processor to limit comparison of the first data fingerprint of the first data item to respective data fingerprints included the blockchain records of the first type.

11. The non-transitory computer readable medium of claim 10, wherein the first data item is designated for data leakage protection, and when the first data fingerprint of the first data item does not match any of the data fingerprints included in the blockchain records of the first type, the instructions, when executed, cause the at least one processor to write a third blockchain record to the blockchain to indicate the first data item is a second protected data item, the third blockchain record to include the first data fingerprint and the first timestamp.

12. The non-transitory computer readable medium of claim 11, wherein the instructions, when executed, cause the at least one processor to include metadata in the third blockchain record, the metadata including ownership information associated with the first data item.

13. A data leakage detection method comprising:
generating, by executing an instruction with at least one processor, a first data fingerprint of a first data item accessed from a data source;
scanning, by executing an instruction with the at least one processor, a blockchain to detect whether a first blockchain record includes a second data fingerprint that matches the first data fingerprint of the first data item, the blockchain different from the data source;
writing, by executing an instruction with the at least one processor, a second blockchain record to the blockchain when the second data fingerprint matches the first data fingerprint, the second blockchain record to indicate the first data item is associated with a data leak of a protected data item represented by the second data fingerprint, the second blockchain record to include the first data fingerprint and a first timestamp; and
issuing, by executing an instruction with the at least one processor, a data leakage notification associated with the protected data item when the second data fingerprint matches the first data fingerprint.

14. The method of claim 13, wherein the second blockchain record includes metadata to identify a location of the first data item.

15. The method of claim 14, wherein the metadata is first metadata, and the second blockchain record include second metadata to identify a type of the second blockchain record.

16. The method of claim 13, wherein the blockchain is to include blockchain records of a first type associated with protected data items and blockchain records of a second type associated with data leak detections, and wherein the scanning is to limit comparison of the first data fingerprint of the first data item to respective data fingerprints included the blockchain records of the first type.

17. The method of claim 16, wherein the first data item is designated for data leakage protection, and further including, when the first data fingerprint of the first data item does not match any of the data fingerprints included in the blockchain records of the first type, writing a third blockchain record to the blockchain to indicate the first data item is a second protected data item, the third blockchain record to include the first data fingerprint and the first timestamp.

* * * * *